(12) United States Patent
Ueki et al.

(10) Patent No.: US 12,276,956 B2
(45) Date of Patent: Apr. 15, 2025

(54) CONTROL SYSTEM, SUPPORT DEVICE AND SUPPORT PROGRAM THAT COMMUNICATES GROUPED PROCESS DATA

(71) Applicant: OMRON Corporation, Kyoto (JP)

(72) Inventors: Takuya Ueki, Ritto (JP); Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 541 days.

(21) Appl. No.: 17/434,218

(22) PCT Filed: Feb. 26, 2020

(86) PCT No.: PCT/JP2020/007783
§ 371 (c)(1),
(2) Date: Aug. 26, 2021

(87) PCT Pub. No.: WO2020/184185
PCT Pub. Date: Sep. 17, 2020

(65) Prior Publication Data
US 2022/0137584 A1  May 5, 2022

(30) Foreign Application Priority Data

Mar. 14, 2019  (JP) ................................ 2019-047306

(51) Int. Cl.
*G05B 19/05* (2006.01)
(52) U.S. Cl.
CPC ......... *G05B 19/052* (2013.01); *G05B 19/058* (2013.01); *G05B 2219/1214* (2013.01)
(58) Field of Classification Search
None
See application file for complete search history.

(56) References Cited

U.S. PATENT DOCUMENTS 5,781,434 A    7/1998  Tobita et al.
5,844,795 A  * 12/1998  Johnston ............... G06F 11/324
                                              700/83

(Continued)

FOREIGN PATENT DOCUMENTS

CN    102164208 A    8/2011
CN    103838570 A    6/2014

(Continued)

OTHER PUBLICATIONS

Supplementary European Search Report issued Nov. 8, 2022 in European Application No. 20769781.4.

(Continued)

*Primary Examiner* — Bernard G Lindsay
(74) *Attorney, Agent, or Firm* — Sughrue Mion, PLLC

(57) ABSTRACT

A control system includes a control device, an information processing device, a grouper, and a generator. The control device executes a control program controlling a control target while managing process data of the control program. The control device transmits one or more types of data sets storing a part of the process data according to a communication setting. The information processing device executes one or more applications using the process data by using the one or more types of data sets. The grouper allocates the process data designated to be used in the one or more applications to one or more groups. The generator generates the communication setting for the control device such that the process data allocated to the group are stored in one data set and transmitted for each of the groups grouped by the grouper according to an allocation result.

12 Claims, 18 Drawing Sheets

(56) References Cited

U.S. PATENT DOCUMENTS

| | | | | |
|---|---|---|---|---|
| 6,052,753 | A | * | 4/2000 | Doerenberg ............ G01S 13/95 |
| | | | | 710/305 |
| 2003/0105545 | A1 | * | 6/2003 | Iwasaki ................ B29C 65/342 |
| | | | | 219/544 |
| 2007/0027915 | A1 | | 2/2007 | Morris |
| 2010/0125671 | A1 | | 5/2010 | Thubert et al. |
| 2013/0331956 | A1 | * | 12/2013 | Kasuya ................ G05B 19/18 |
| | | | | 700/11 |
| 2014/0147034 | A1 | | 5/2014 | Ito et al. |
| 2015/0025656 | A1 | | 1/2015 | Ono et al. |
| 2015/0378340 | A1 | | 12/2015 | Nagata |
| 2016/0246545 | A1 | * | 8/2016 | Yokoi ................... G06F 3/0667 |
| 2017/0041266 | A1 | | 2/2017 | Walkin et al. |
| 2017/0293288 | A1 | * | 10/2017 | Nakaya .............. G05B 19/4155 |
| 2017/0315541 | A1 | * | 11/2017 | Kreidler ............. G05B 19/4185 |
| 2018/0088548 | A1 | | 3/2018 | Sangi |
| 2018/0219721 | A1 | | 8/2018 | Sawada et al. |
| 2019/0089744 | A1 | * | 3/2019 | Hornung ................ H04L 63/20 |
| 2019/0356743 | A1 | * | 11/2019 | Park ........................ H04W 4/70 |
| 2020/0183345 | A1 | * | 6/2020 | Wang .................... G06F 16/285 |

FOREIGN PATENT DOCUMENTS

| | | | |
|---|---|---|---|
| CN | 107567604 | A | 1/2018 |
| CN | 108028796 | A | 5/2018 |
| CN | 108377255 | A | 8/2018 |
| EP | 3 557 453 | A1 | 10/2019 |
| JP | 04-10107 | A | 1/1992 |
| JP | H08-115281 | A | 5/1996 |
| JP | 08-147007 | A | 6/1996 |
| JP | 2000-242326 | A | 9/2000 |
| JP | 2002-358105 | A | 12/2002 |
| JP | 2013-161106 | A | 8/2013 |
| JP | 2016-12173 | A | 1/2016 |
| JP | 2016-100846 | A | 5/2016 |
| JP | 2016-126495 | A | 7/2016 |
| JP | 2016-208129 | A | 12/2016 |
| JP | 2017-146803 | A | 8/2017 |
| JP | 2018-013960 | A | 1/2018 |
| WO | 2019/041145 | A1 | 3/2019 |

OTHER PUBLICATIONS

Notice of Reasons for Refusal dated Nov. 30, 2021 from the Japanese Patent Office in JP Application No. 2019-047306.
International Search Report for PCT/JP2020/007783 dated Apr. 28, 2020 (PCT/ISA/210).
Written Opinion for PCT/JP2020/007783 dated Apr. 28, 2020 (PCT/ISA/237).
Office Action issued Jan. 6, 2024 in Chinese Application No. 202080017707.7.
Communication dated May 31, 2024, issued in Chinese Application No. 202080017707.7.
Decision to Grant a Patent dated Sep. 24, 2024 issued in Chinese Application No. 202080017707.7.

* cited by examiner

| Conection ID | SEQUENCE NUMBER | TYPE OF PROCESS DATA |
|---|---|---|
| 0x43d 10502 | 0407 | NX1B_UNINT_IN |
| | 0507 | NX1B_BYTE_IN |
| | ⋮ | ⋮ |
| 0x43d 10203 | 0407 | NX1B_UDINT_IN |
| | ⋮ | ⋮ |
| ⋮ | | |

CONTROL SYSTEM, SUPPORT DEVICE AND SUPPORT PROGRAM THAT COMMUNICATES GROUPED PROCESS DATA

CROSS REFERENCE TO RELATED APPLICATIONS

This application is a National Stage of International Application No. PCT/JP2020/007783 filed Feb. 26, 2020, claiming priority based on Japanese Patent Application No. 2019-047306 filed Mar. 14, 2019, the entire contents of each of which being herein incorporated by reference in their entireties.

TECHNICAL FIELD

The present invention relates to a function of supporting setting of a communication environment between a control device and an information processing device that executes one or a plurality of applications using process data managed by the control device.

BACKGROUND ART

A control device such as a PLC (Programmable Logic Controller) is introduced in various manufacturing sites. The control device is a kind of computer, and executes a control program designed according to a manufacturing device or a manufacturing facility. Such a control device is communicably connected to an information processing device such as a human machine interface (HMI).

For example, the information processing device uses information from the control device to graphically display an operating state or the like of a control target of the control device, or uses information from the control device to execute an application different from the application that is displayed.

For example, Japanese Patent Laying-Open No. 2017-146803 (PTL 1) discloses a program display as an example of the information processing device connected to the PLC. In the program display, when one screen displayed on a display screen is defined as one page, a layout of functional components displayed on the page, allocation of functions, and the like are performed in units of pages.

CITATION LIST

Patent Literature

PTL 1: Japanese Patent Laying-Open No. 2017-146803

SUMMARY OF INVENTION

Technical Problem

PTL 1 does not describe how to specifically acquire information necessary for implementing the function allocated to each page. Information (hereinafter, referred to as "process data") of the control device which is the PLC is used as an application implementing this function. The user needs to perform communication setting on the control device such that process data used for the application is transmitted.

An object of the present invention is to easily perform the communication setting in which the process data necessary for execution of the application is transmitted from the control device to the information processing device.

Solution to Problem

According to one aspect of the present disclosure, a control system including a control device, an information processing device, a grouping unit, and a generation unit is provided. The control device is configured to execute a control program controlling a control target while managing a plurality of pieces of process data referred to or updated in the control program, and the control device is configured to transmit one or a plurality of types of data sets storing at least a part of the plurality of pieces of process data according to a predetermined communication setting. The information processing device configured to execute one or a plurality of applications using one or a plurality of pieces of process data designated in the plurality of pieces of process data by using the one or the plurality of types of data sets transmitted from the control device. The grouping unit configured to allocate each of the one or the plurality of pieces of process data designated to be used in the one or the plurality of applications to one or a plurality of groups. The generation unit configured to generate the communication setting for the control device such that the one or the plurality of pieces of process data allocated to the group are stored in one data set and transmitted for each of the one or the plurality of groups grouped by the grouping unit according to an allocation result of the grouping unit.

According to this disclosure, because the communication setting is automatically generated according to the application executed by the information processing device, the communication setting in which the process data necessary for the execution of the application is transmitted from the control device to the information processing device can be easily performed.

In the above disclosure, the communication setting may include information specifying the one or the plurality of pieces of process data to be stored in each data set.

According to this disclosure, because a combination of process data to be stored in one data set is defined, a processing load in which the control device generates the data set can be reduced as compared with the case where a storage rule is simply defined.

In the above disclosure, the communication setting may include information specifying storage order of the one or the plurality of pieces of process data in each data set.

According to this disclosure, the control device does not need to determine the storage order each time the data set is generated, and the processing load of generating the data set of the control device can be reduced. Furthermore, for example, the communication setting including the information specifying the storage order is transmitted to both the information processing device and the control device, so that a data link between the information processing device and the control device can be easily configured.

In the above disclosure, the control system may further include a support device configured to provide a development environment of the one or the plurality of applications. In the control system, the support device may include the grouping means and the generation means.

According to this disclosure, because the support device including the grouping means and the generation means provides the development environment of the application, the development of the application and the communication setting can be collectively performed.

In the above disclosure, the control system may further include a relay device configured to relay communication between the control device and the information processing device. In the control system, the relay device may include the grouping means and the generation means.

According to this disclosure, data exchange between the information processing device and the control device can be implemented without previously performing the communication setting on the control device.

In the above disclosure, the information processing device may manage a plurality of application data referred to or updated in the one or the plurality of applications, and transmit one or a plurality of types of application data sets storing at least a part of the plurality of application data according to a predetermined communication setting of the information processing device. The control device may execute the control program using one or a plurality of application data designated in the plurality of application data using the application data set. The grouping unit may allocate each of the one or the plurality of application data specified to be used in the control program to one or a plurality of control program groups. The generation unit may generate the communication setting of the information processing device such that one or a plurality of application data allocated to the control program group is stored in one application data set and transmitted for each of the one or the plurality of control program groups grouped by the grouping unit according to the allocation result of the grouping unit.

According to this disclosure, the communication setting of the information processing device is automatically generated according to the control program when the application data is used for the execution of the control program, so that the communication setting of the information processing device can be easily performed such that the application data necessary for the execution of the control program is transmitted from the information processing device to the control device.

According to another aspect of the present disclosure, a support device that supports a setting of a communication environment between a control device and an information processing device is provided. The control device is configured to execute a control program controlling a control target while managing a plurality of pieces of process data referred to or updated in the control program, and the control device is configured to transmit one or a plurality of types of data sets storing at least a part of the plurality of pieces of process data according to a predetermined communication setting. The information processing device configured to execute one or a plurality of applications using one or a plurality of pieces of process data designated in the plurality of pieces of process data by using the one or the plurality of types of data sets transmitted from the control device. The support device includes a grouping unit configured to allocate each of the one or the plurality of pieces of process data designated to be used in the one or the plurality of applications to one or a plurality of groups and a generation unit configured to generate the communication setting for the control device such that the one or the plurality of pieces of process data assigned to the group are stored in one data set and transmitted for each of the one or the plurality of groups grouped by the grouping unit according to an allocation result of the grouping unit.

According to this disclosure, because the communication setting is automatically generated according to the application executed by the information processing device, the communication setting in which the process data necessary for the execution of the application is transmitted from the control device to the information processing device can be easily performed.

According to still another example of the present disclosure, there is provided a support program for supporting setting of a communication environment between a control device and an information processing device. The control device is configured to execute a control program controlling a control target while managing a plurality of pieces of process data referred to or updated in the control program, and the control device is configured to transmit one or a plurality of types of data sets storing at least a part of the plurality of pieces of process data according to a predetermined communication setting. The information processing device configured to execute one or a plurality of applications using one or a plurality of pieces of process data designated in the plurality of pieces of process data by using the one or the plurality of types of data sets transmitted from the control device. The support program causes a computer to execute allocating each of the one or the plurality of pieces of process data designated to be used in the one or the plurality of applications to one or a plurality of groups, and generating the communication setting for the control device such that the one or the plurality of pieces of process data assigned to the group are stored in one data set and transmitted for each of the one or the plurality of groups grouped in the grouping according to an allocation result in the grouping.

According to this disclosure, because the communication setting is automatically generated according to the application executed by the information processing device, the communication setting in which the process data necessary for the execution of the application is transmitted from the control device to the information processing device can be easily performed.

Advantageous Effects of Invention

According to an aspect of the present disclosure, the communication setting can be easily performed such that in which the process data necessary for the execution of the application is transmitted from the control device to the information processing device.

DESCRIPTION OF EMBODIMENTS

Figure 1:
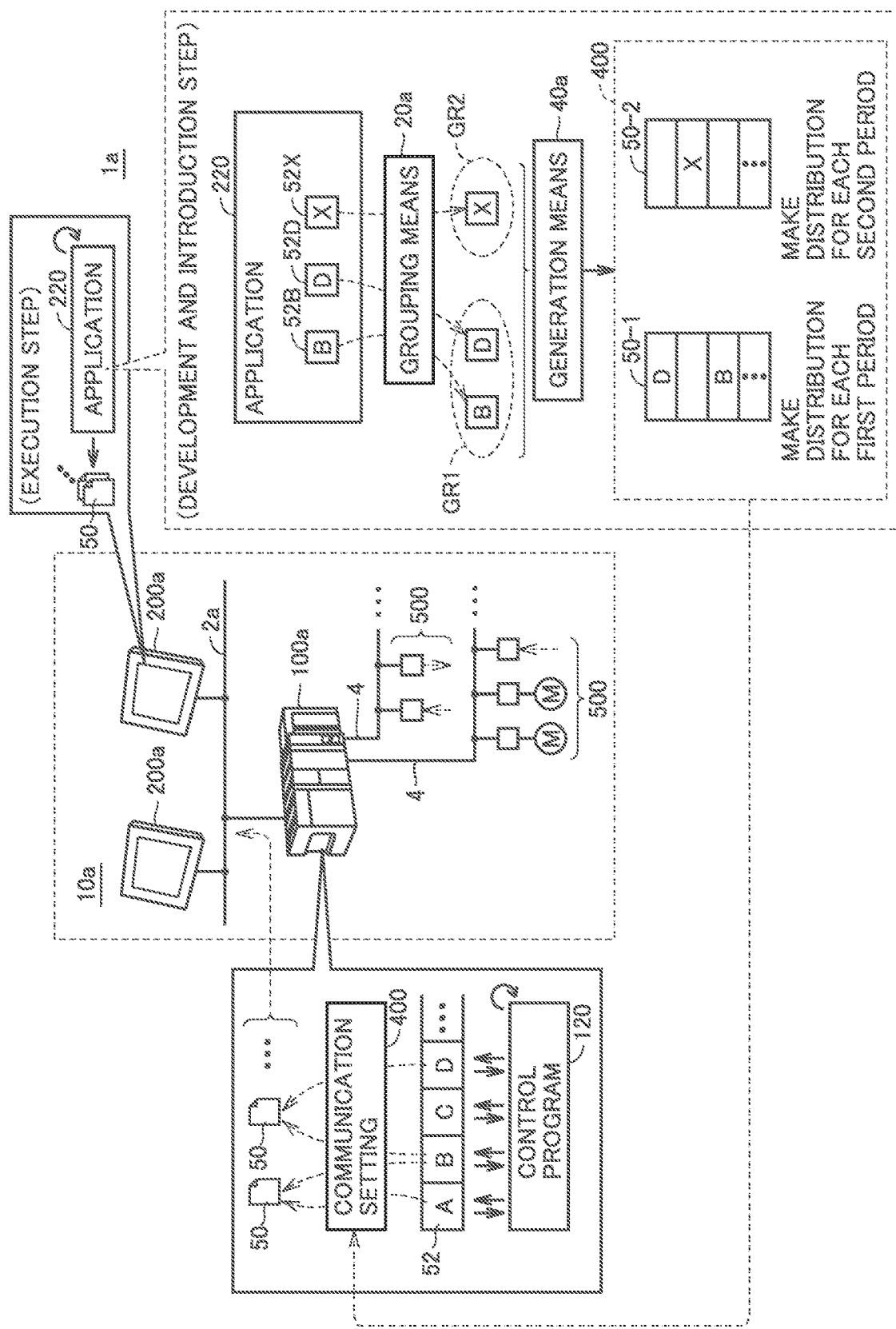
FIG. 1 is a schematic diagram illustrating an application scene of a control system 1*a* centering on an FA system 10*a*.

Hereinafter, an embodiment of the present invention will be described with reference to the drawings. In the following description, the same parts and components are denoted by the same reference numeral. Their names and functions are the same. Thus, the detailed description thereof will not be repeated. The following embodiment and modifications described below may selectively be combined as appropriate.

§ 1 APPLICATION EXAMPLE

FIG. 1 is a schematic diagram illustrating an application scene of a control system 1a centering on an FA system 10a. Control system 1a provides a function of supporting a setting of a communication environment between devices included in FA system 10a.

FA system 10a includes a controller 100a and an HMI 200a. Controller 100a is communicably connected to HMI 200a through an information system network 2a. Information system network 2a is a network conforming to a communication standard capable of implementing data exchange without depending on, for example, a vendor or a type of an operating system (OS). For example, object linking and embedding for process control unified architecture (OPC UA) is known as the communication standard.

The communication standard adopted in information system network 2a is not limited to OPC-UA. For example, information system network 2a may be a network conforming to a communication standard peculiar to a specific vendor or the OS, or may be a network conforming to EtherNet/IP (registered trademark) which is an industrial open network in which a control protocol is mounted on Ethernet (registered trademark).

FA system 10a may be configured by a plurality of controllers 100a. FA system 10a may be configured by a plurality of HMIs 200a. FA system 10a may have a configuration in which one HMI 200a is communicably connected to one controller 100a, a configuration in which one HMI 200a is communicably connected to a plurality of controllers 100a, a configuration in which a plurality of HMIs 200a is communicably connected to one controller 100a, or a configuration in which a plurality of HMIs 200a is communicably connected to a plurality of controllers 100a. In the example of FIG. 1, FA system 10a has a configuration in which two HMIs 200a are communicably connected to one controller 100a.

Controller 100a is an example of the control device of the present invention, executes a control program 120 controlling a control target, and executes a central processing in FA system 10a. In the example of FIG. 1, controller 100a is communicably connected to field device 500 that is the control target through a control system network 4. Preferably, a network that performs fixed-period communication guaranteeing a data arrival time is used as control system network 4. EtherCAT (registered trademark), EtherNet/IP (registered trademark), DeviceNet (registered trademark), CompoNet (registered trademark), and the like are known as the network that performs the fixed-period communication.

Field device 500 includes various industrial devices that automate a production process, and includes a device that gives some physical action to a manufacturing device, a production line, or the like (hereinafter, also collectively referred to as a "field") and an input and output device that exchanges information with the field. For example, field device 500 includes a servo driver that controls a servo motor, a robot controller that controls a robot, a sensor that is a device that collects data, an actuator that moves a conveyor, a remote input and output (I/O) device, or the like.

Controller 100a controls field device 500 by executing control program 120. In addition, controller 100a manages a plurality of pieces of process data 52 that are referred to or updated in association with the execution of control program 120.

Process data 52 includes data input from field device 500 to controller 100a, data output from controller 100a to field device 500, and data used for the execution of control program 120 or state management of controller 100a. Process data 52 is updated periodically or on an event basis in association with the execution of control program 120.

Controller 100a transmits a plurality of types of data sets 50 storing at least a part of the plurality of pieces of process data 52 according to a predetermined communication setting 400. The plurality of types of data sets 50 are different from each other in at least one element of a combination of stored process data 52, a transmission trigger, and a transmission destination.

HMI 200a is an example of the information processing device of the present invention, and executes application 220 using process data 52 included in data set 50 transmitted by controller 100a. In the example of FIG. 1, HMI 200a executes application 220 to present various types of information obtained by the execution of control program 120 to an operator.

HMI 200a may directly receive data set 50 transmitted by controller 100a from controller 100a, or receive data set 50 through another device such as a relay device.

The information processing device that executes application 220 using process data 52 managed by controller 100a is not limited to HMI 200a. For example, the information processing device may be a database that collects information regarding traceability measured from field device 500 that is the control target, a supervisory control and data acquisition (SCADA) device that performs the process control and centralized monitoring, or the like.

Furthermore, the information processing device is not limited to a device connected to controller 100a through information system network 2a, and may be a robot controller that controls a robot connected through control system network 4, an actuator, another controller, or the like. That is, application 220 is not limited to one intended to present information, but may be one intended to implement a function using process data 52 managed by controller 100a. In the following, the application is intended to present the information, and will be described as a program that provides a function of displaying an image on the display.

Furthermore, in the example of FIG. 1, the control device and the information processing device are different from each other and are physically connected to each other, but the control device and the information processing device may be logically connected to each other.

At the execution stage of application 220, HMI 200a executes application 220 using process data 52 stored in data set 50 distributed from controller 100a. That is, application 220 is executed on the assumption that process data 52 used in application 220 is transmitted from controller 100a. In addition to FA system 10a, control system 1a has a function of generating communication setting 400 such that process data 52 necessary for the execution of application 220 is transmitted from controller 100a to HMI 200a.

A stage at which application 220 is developed and introduced into FA system 10a and a stage at which communication setting 400 is generated will be described below. Control system 1a includes grouping means 20a and generation means 40a in addition to controller 100a and HMI 200a. Typically, a processor of a support device that provides the development environment of application 220 executes a support program supporting the setting of the communication environment, thereby implementing the function of each of grouping means 20a and generation means 40a.

The function of each of grouping means 20a and generation means 40a may be implemented by a dedicated setting device. In addition, a relay device may be provided between HMI 200a and controller 100a, and each function of grouping means 20a and generation means 40a may be implemented by the relay device.

In FIG. 1, a description will be given assuming that the timing of the generation of communication setting 400 is performed at an introduction stage before application 220 is executed. The timing of the generation of communication setting 400 may be performed at the execution stage of the application. For example, communication setting 400 may be generated or updated every time application 220 to be executed is switched.

Application 220 may be distributed in a state stored in a memory card or a database in an installable format, or may be produced by the user.

Grouping means 20a allocates process data 52 designated to be used in application 220 to one or a plurality of groups. For example, grouping means 20a extracts a predetermined element, and groups process data 52 based on the extracted element. The predetermined elements include a type of controller 100a that manages process data 52, a period at which controller 100a updates process data 52, a period at which application 220 uses process data 52, a data size of process data 52, and the like. In addition, grouping means 20a may allocate process data 52 designated to be used in application 220 to one or the plurality of groups so as to satisfy a condition arbitrarily set by the user.

Generation means 40a generates communication setting 400 according to the allocation result of grouping means 20a such that one or a plurality of pieces of process data 52 included in one group is stored in one data set 50 and transmitted for each of the plurality of groups.

In the example of FIG. 1, application 220 uses process data 52B, process data 52D, and process data 52X. For example, grouping means 20a groups the plurality of pieces of process data 52 for each period used in application 220. In the example of FIG. 1, application 220 updates the information using process data 52B and process data 52D every first period, and updates the information using process data 52X every second period. In FIG. 1, reference numerals are partially omitted.

Grouping means 20a allocates process data 52B and process data 52D to a group GR1, and allocates process data 52X to a group GR2.

Generation means 40a generates communication setting 400 such that process data 52B and process data 52D are stored in one data set 50-1 and such that process data 52X is stored in another data set 50-2. Communication setting 400 includes a condition that transmits data set 50, order in which the data is stored in data set 50, a type of data stored in data set 50, and the like.

For example, generation means 40a determines communication setting 400 according to information such as an attribute of process data 52, a communication protocol used for information system network 2a, and a network configuration of FA system 10a centered on controller 100a. For example, the attributes of process data 52 include the timing referred to or updated in control program 120 and a data size.

For example, the condition that data set 50 is transmitted is defined according to the timing at which controller 100a updates process data 52, the timing at which application 220 uses process data 52, and the like. For example, in the example of FIG. 1, the communication setting is generated such that process data 52B and process data 52X used for generating the information in which the update period is the first period are distributed every first period.

As described above, control system 1a includes grouping means 20a and generation means 40a to generate communication setting 400 of controller 100a based on application 220. As a result, communication setting 400 in which process data 52 necessary for executing application 220 is transmitted from controller 100a to HMI 200a can be easily performed.

§ 2 CONFIGURATION EXAMPLE

A configuration example in which the control system described in the above application example is implemented will be described below.

First Embodiment

<Entire Configuration of Control System 1>

Figure 2:
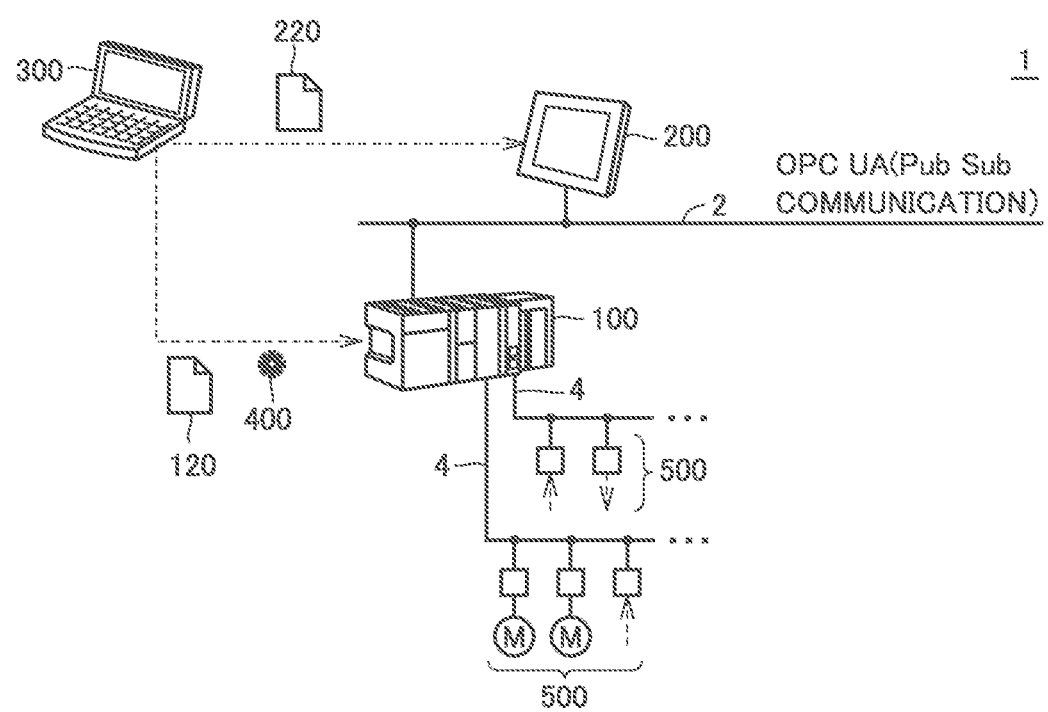
FIG. 2 is a view illustrating an outline of a control system 1 according to a first embodiment.

FIG. 2 is a view illustrating an outline of a control system 1 according to a first embodiment. Control system 1 includes support device 300, controller 100, and HMI 200.

In the first embodiment, a communication scheme between controller 100 and HMI 200 will be described as a public-subscribe communication scheme of the OPC UA. Hereinafter, communication to which the public-subscribe communication scheme of the OPC-UA is applied is also referred to as PubSub communication. An outline of the PubSub communication will be described later.

Controller 100 directly or indirectly controls the one or the plurality of field devices 500. The network configuration of field device 500 controlled by controller 100 is arbitrarily designed by the user.

In the example of FIG. 2, controller 100 and HMI 200 are connected to each other on a one-to-one basis. The method for connecting controller 100 and HMI 200 is not limited thereto, but another device may be provided between controller 100 and HMI 200.

The configuration of the network including controller 100 and HMI 200 and the configuration of the network including controller 100 and field device 500 are not limited to the example in FIG. 2, but can be arbitrarily designed by the user. For example, HMI 200 may be communicably connected to the plurality of controllers 100. Controller 100 may be communicably connected to the plurality of HMIs 200.

Support device 300 provides a development environment of application 220 executed by HMI 200 and a development environment of control program 120 executed by controller 100, and provides an environment for setting the communication environment between controller 100 and HMI 200. Such the development environment and the setting environment are provided by installing a support program in support device 300. For example, the support program is "Sysmac Studio" (product of OMRON Corporation).

The user can design control program 120 for controller 100 using the support program, and install designed control program 120 in controller 100. In addition, the user can design application 220 for HMI 200 using the support program, and install designed application 220 in HMI 200. Support device 300 executes the support program to generate communication setting 400 implementing application 220 from designed control program 120 and application 220, and installs generated communication setting 400 in controller 100.

The program developing control program 120, the program developing application 220, and the program generating communication setting 400 do not need to be packaged and provided in one program, but may be separately provided.

Furthermore, communication setting 400 does not need to be generated in an installable format from support device 300 toward controller 100, but for example, may be generated in a report format. In this way, the user can easily set the controller in which communication setting 400 cannot be directly installed from support device 300.

<B. PubSub Communication>

Figure 3:
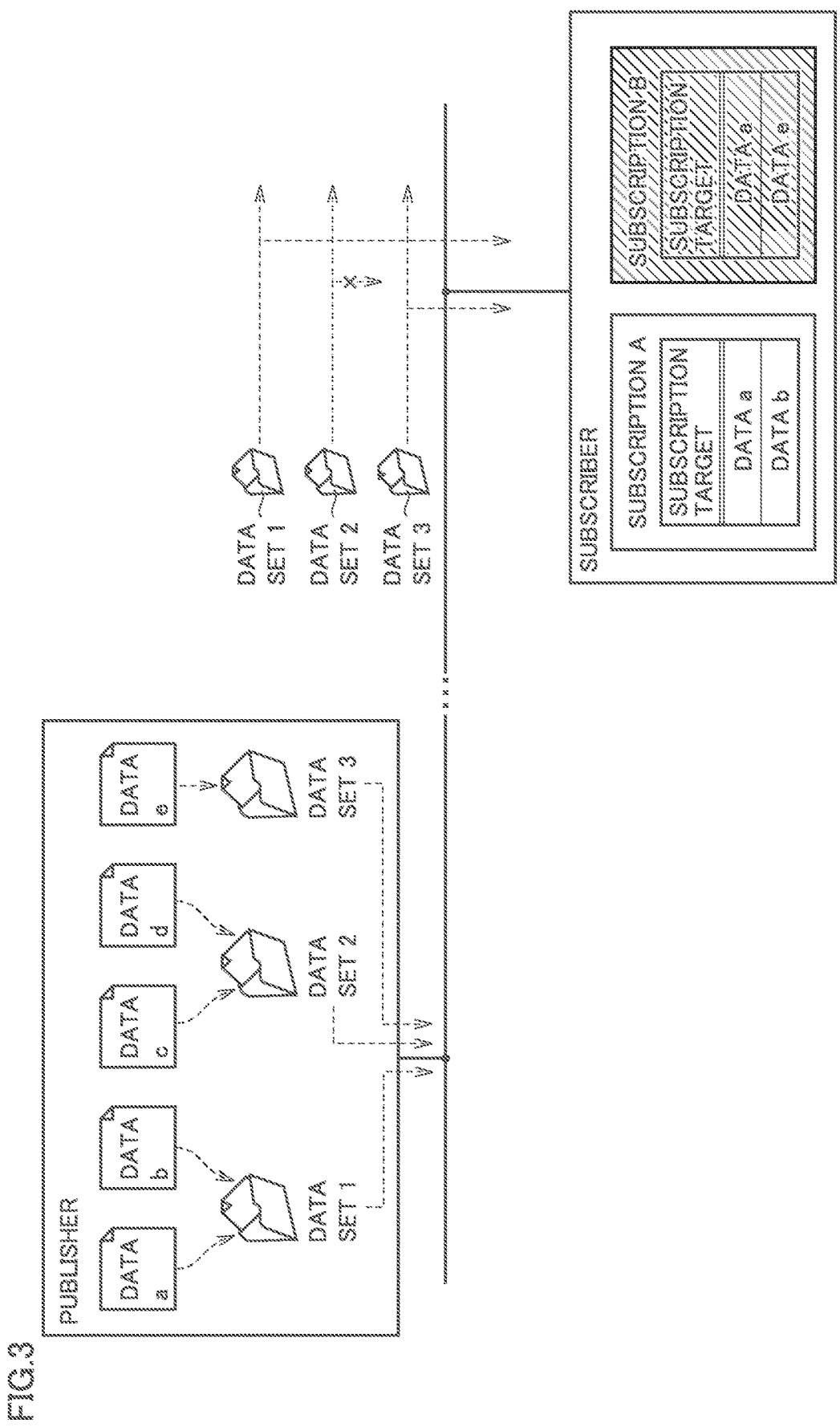
FIG. 3 is a view illustrating an outline of Pub/Sub communication.

FIG. 3 is a view illustrating an outline of PubSub communication. In the following description, a side that distributes data is referred to as a "publisher", and a side that subscribes to data distributed by the publisher is referred to as a "subscriber". In control system 1 of the first embodiment, controller 100 corresponds to a publisher that distributes the data. On the other hand, HMI 200 corresponds to the subscriber that subscribes to the data distributed by controller 100.

The publisher generates and distributes a data set storing one or a plurality of pieces of data. The publisher multicasts the data set to the network including the publisher and subscriber without specifying a destination.

The subscriber has one or a plurality of subscriptions that define the data of the subscription target. The subscriber starts or stops the subscription for each subscription. For example, in the example of FIG. 3, the subscriber starts the subscription of data a and data b when starting the subscription of subscription A. On the other hand, when the subscription of subscription B is started, the subscription of data a and data e is started. Different subscriptions may include a common subscription target.

The subscriber receives at least a data set including data included in the currently-subscribed subscription in the plurality of types of data sets distributed by the publisher. For example, in the example of FIG. 3, the currently-subscribed subscription is indicated by hatching. When subscribing to subscription B, the subscriber receives at least a data set 1 in which data a and data b are stored and a data set 3 in which data e is stored. The subscriber does not receive a data set 2 in the example of FIG. 3, but may receive data set 2. The subscriber only needs to be able to read at least the data of the subscription target, and may receive the data set (data set 1) including the data that is not the subscription target as illustrated in the example of FIG. 3.

The method by which the subscriber manages the start and stop of the data subscription is not limited to the method in FIG. 3. For example, the subscriber may perform the management for each data.

Figure 4:
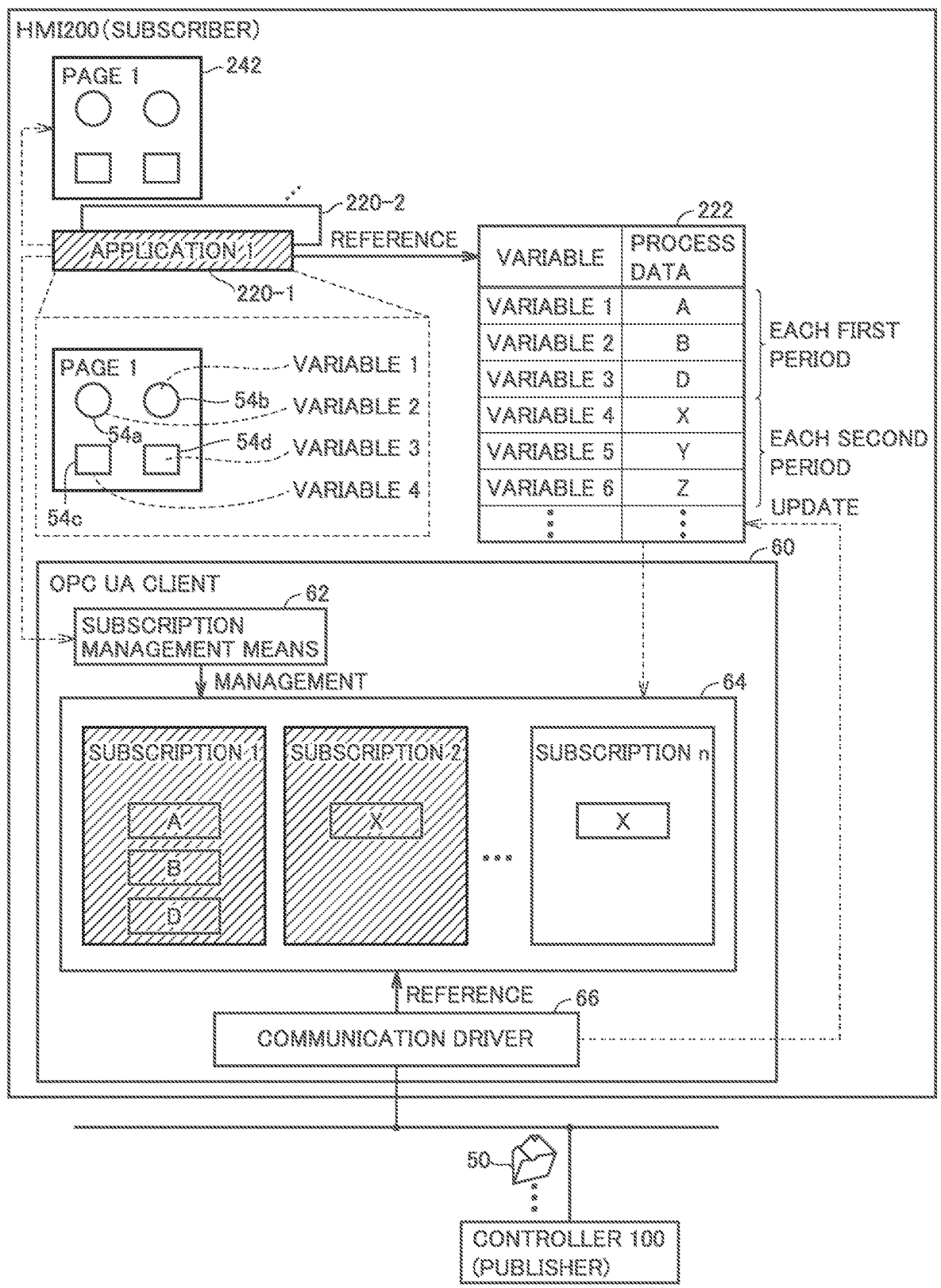
FIG. 4 is a view illustrating an outline of an HMI 200 that functions as a subscriber.
Figure 5:
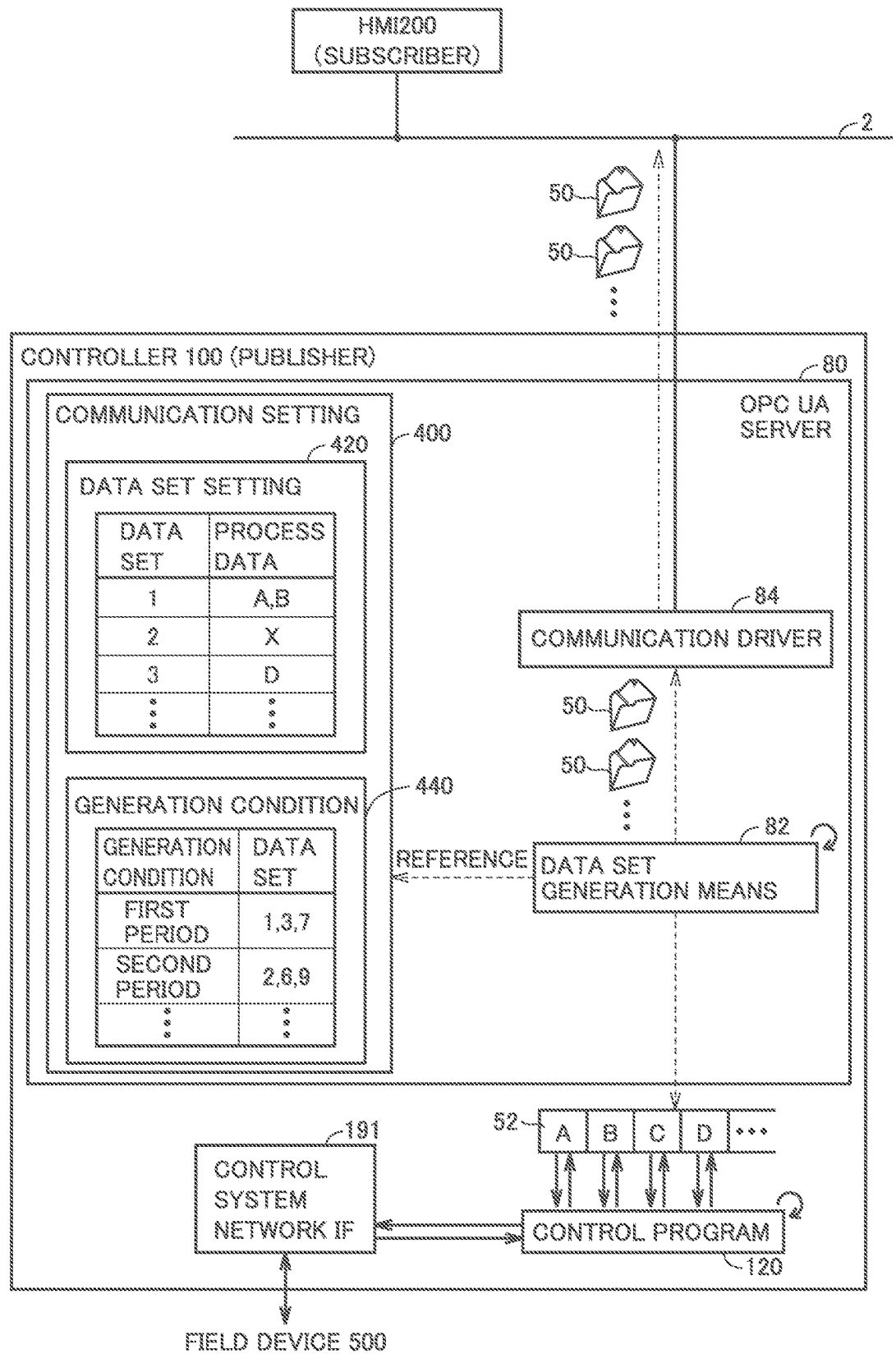
FIG. 5 is a view illustrating an outline of a controller 100 that functions as a publisher.

With reference to FIGS. 4 and 5, an outline of PubSub communication between HMI 200 and controller 100 will be described. FIG. 4 is a view illustrating an outline of HMI 200 that functions as the subscriber. FIG. 5 is a view illustrating an outline of controller 100 that functions as the publisher.

Referring to FIG. 4, HMI 200 includes a display 242, a plurality of applications 220 (220-1, 220-2 . . . ), and an OPC UA client 60. Each application 220 is a program displaying a specific page on display 242. FIG. 4 illustrates an example in which an application 1 displaying page 1 on display 242 is executed.

Each page includes a plurality of objects 54. For example, page 1 includes an object 54*a* to an object 54*d*. The display of object 54 is updated according to a value of a variable included in the program. For example, the display of object 54*a* is updated according to the value of a variable 2. Similarly, the display of object 54*b* is updated according to the value of a variable 1, the display of object 54*c* is updated according to the value of a variable 4, and the display of object 54*d* is updated according to the value of a variable 3.

Application 220 refers to mapping information 222 to update the value of the variable. Mapping information 222 is information in which the variable and the process data are associated with each other. For example, the value of variable 1 is updated according to the value of process data A. The period at which the value of each process data is updated may be set by the user according to the production of application 220, or determined according to the update period of controller 100 that manages the process data. In the example of FIG. 4, it is assumed that the values of process data A to process data D are updated every first period by controller 100, and the values of process data X to process data Z are updated every second period by controller 100.

OPC UA client 60 causes HMI 200 to function as the subscriber. OPC UA client 60 includes subscription management means 62, a plurality of subscriptions 64 (subscriptions 1 to n), and a communication driver 66.

Subscription management means 62 manages the subscription start and the subscription stop of subscription 64 according to currently-executed application 220. Specifically, subscription management means 62 determines subscription 64 to be subscribed such that the process data referred to by currently-executed application 220 becomes the subscription target in the plurality of subscriptions 64. In the example of FIG. 4, the currently-subscribed subscription is indicated by hatching.

The subscription 64 is generated in advance according to the application 220 and the mapping information 222. As an example, subscription 64 is generated for each application 220. In addition, subscription 64 is generated every period in which process data 52 is updated in controller 100. In the example of FIG. 4, subscription 64 is generated based on the type of application 220 and the period updated by controller 100. More specifically, process data A, B, D, X referred to in application 1 are allocated to subscription 1 and subscription 2 at every period updated by controller 100.

Because subscription management means 62 manages the start and stop of the subscription according to currently-executed application 220, the subscription is generated according to each application 220. All the process data included in one subscription 64 does not need to generate the subscription such that the subscription is used by one application, but the plurality of pieces of process data used by different applications may be included in one subscription.

The management is not limited to the management by subscription 64 as long as subscription management means 62 can manage the subscription start and the subscription stop of process data 52.

Communication driver 66 filters data set 50 transmitted from controller 100 to receive data set 50 in which the currently-subscribed process data is stored. HMI 200 updates the process data included in the mapping information 222 using the process data included in data set 50 received by communication driver 66.

Referring to FIG. 5, controller 100 includes control program 120, a control system network interface (IF) 191, and OPC UA server 80.

Controller 100 executes control program 120 to control field device 500. For example, control program 120 updates process data 52 using a state value of field device 500 input through control system network IF 191, and refers to updated process data 52 to execute the control arithmetic operation. Control program 120 updates the value of process data 52 according to the result of the executed control arithmetic calculation, and outputs the updated value of process data 52 as the control value to field device 500 through control system network IF 191.

OPC UA server 80 causes controller 100 to function as the publisher. OPC UA server 80 includes data set generation means 82 that generates data set 50 and a communication driver 84 that transmits data set 50.

Data set generation means 82 refers to communication setting 400 to generate data set 50 storing one or the plurality of pieces of process data 52. Data set 50 may refer to a set of process data 52 or a data set in a format that can be output onto information system network 2.

Communication setting 400 includes a data set setting 420 and a generation condition 440. Data set setting 420 is information for specifying process data 52 stored in one data set 50. Only one process data 52 may be specified to be stored in one data set 50, or the plurality of pieces of process data 52 may be specified to be stored in one data set. That is, the term "data set" means a combination of one or more process data 52 stored in data set 50.

That is, controller 100 generates the data set according to data set setting 420. Thus, the processing load on controller 100 is reduced as compared with the case where communication setting 400 defines the process data of a specific attribute as one data set.

Generation condition 440 defines a condition that generates data set 50. In the example of FIG. 5, as an example, it is specified that the data set 1, data set 3, and data set 7 are generated for each first period, and that data set 2, data set 6, and data set 9 are generated for each second period.

Communication driver 84 distributes data set 50 generated by data set generation means 82 onto information system network 2.

Referring to FIGS. 4 and 5, OPC UA server 80 generates and transmits data set 1 storing process data A and process data B and data set 3 storing process data D for each first period. When application 1 is currently executed, OPC UA client 60 sets subscription 1 to be under subscription and reads data set 1 and data set 3. Thus, application 1 updates the display of objects 54a, 54b, 54d by updating variables 1 to 3 at the period in which process data A, process data B, and process data D corresponding to variables 1 to 3 are updated by controller 100.

In addition, OPC UA server 80 generates and transmits data set 2 storing process data X for every second cycle. When application 1 is currently executed, OPC UA client 60 sets subscription 2 to be under subscription and reads data set 2. Thus, application 2 updates variable 4 at the period in which process data X corresponding to variable 4 is updated by controller 100, and updates the display of object 54c.

When the application of the execution target changes, OPC UA client 60 changes subscription 64 of the subscription target and changes data set 50 of the read target. Hereinafter, changing subscription 64 of the subscription target is also referred to as "changing subscription 64", and changing the subscription target by changing subscription 64 is also referred to as "changing a subscription request".

As described above, in the PubSub communication, even when the application of the execution target is changed, it is not necessary to change the processing on the publisher side. For this reason, the PubSub communication can reduce the number of exchanges performed between the data transmission side and the data reception side as compared with the command and response scheme communication.

On the other hand, OPC UA client 60 also changes the subscription request by changing subscription 64 according to the change of application 220 of the execution target. In order to implement the PubSub communication between controller 100 and HMI 200, the side of controller 100 (publisher) needs to generate data set 50 so as to satisfy each subscription request that changes according to a change of application 220. That is, the user needs to design communication setting 400 of controller 100 so as to satisfy the subscription request specialized for each of all applications 220 executed by HMI 200 that is of the subscriber.

In the first embodiment, support device 300 generates communication setting 400 satisfying the subscription request specialized for each application 220 based on generated application 220. As a result, the burden on the user is reduced.

<C. Flowchart from Development of Application to Introduction>

Figure 6:
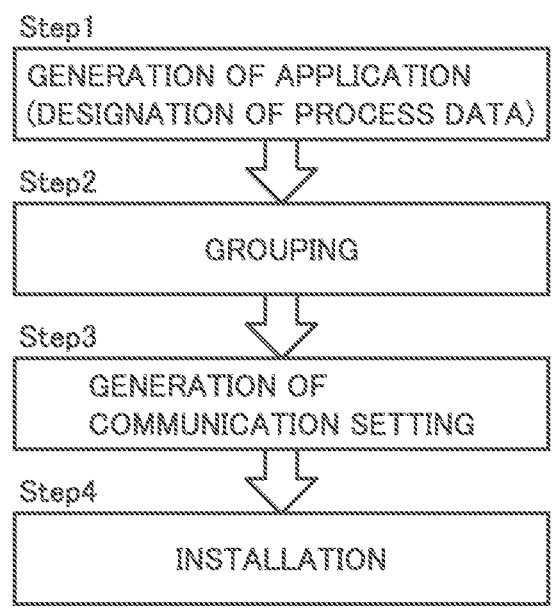
FIG. 6 is a view illustrating an example of a series of flow from development of an application to introduction of the developed application.

FIG. 6 is a view illustrating an example of a series of flowchart from development of the application to introduction of the developed application. In FIG. 6, it is assumed that the control program is previously designed. Each step in FIG. 6 is executed by support device 300. With reference to FIG. 6, the timing at which communication setting 400 is generated will be described.

(Step 1: Generation of Application)

The "generation of the application" includes the design of a content displayed on HMI 200, the production of the application implementing the design content, and designation of the process data used in the application. There are various flows from the production of the application to the specification of the process data used in the application. For example, the process data used in the application may be designated in a process of producing the application, or the process data may be designated for each variable after the entire application is produced.

Support device 300 stores the information that can specify the type of process data referred to or updated in the control program in the memory. Support device 300 presents the information that can specify the type of the process data stored in the memory to the user, and the user designates the process data used for the application from among the types of the presented process data.

A method for designating the process data includes a method for directly specifying the process data to be used and a method for associating the process data with the variable used for the application. In the first embodiment, it is assumed that the process data used for the application is designated by associating the process data with the variable used for the application. Thus, the process data to be used is specified for each application.

When the generation of the application is completed, mapping information 222 in which the variable used for the application and the process data are associated with each other is also generated. Support device 300 may generate the mapping information for each application, or generate one piece of mapping information for the plurality of applications. In the first exemplary embodiment, it is assumed that one piece of mapping information is generated for the plurality of applications.

As the application is generated, support device 300 generates subscription 64. For example, subscription 64 is generated for each application 220 in order that subscription management means 62 easily manage the start and stop of the subscription. Furthermore, for example, subscription 64 is generated for each update period of controller 100 such that communication driver 66 can easily refer to the subscription.

(Step 2: Grouping)

Support device 300 allocates each of process data 52 used in the application to one or a plurality of groups. For example, support device 300 extracts a predetermined element from each of the plurality of pieces of process data 52, and groups process data 52 based on the extracted element.

For example, the extracted element includes the period at which process data 52 is updated, the period at which process data 52 is updated in the application, and the application in which process data 52 is used. When HMI 200 is communicably connected to the plurality of controllers 100, controller 100 that manages process data 52 may be included in the extracted element. In addition, the grouping means may allocate process data 52 designated to be used in application 220 to one or the plurality of groups so as to satisfy a condition arbitrarily set by the user. Support device 300 may repeat the allocation of the groups until the total amount of process data included in one group falls below the size of data set 50 transmittable at one-time determination according to the communication performance of information system network 2.

For example, the grouping based on the extracted element is performed according to the attribute of stored process data 52, the configuration of the network including controller 100, the transmission performance controller 100, the reception performance of HMI 200, and the communication performance of information system network 2. For example, the attributes of process data 52 include the timing referred to or updated in control program 120 and a data size.

(Step 3: Generation of Communication Setting)

Support device 300 generates communication setting 400 such that one or the plurality of pieces of process data 52 included in each group are stored in one data set 50 according to the allocation result of process data 52. For example, communication setting 400 is generated based on a communication protocol between HMI 200 and controller 100 or the configuration of the network including controller 100.

(Step 4: Installation)

Support device 300 installs application 220 and subscription 64 generated in step 1 in HMI 200, and installs communication setting 400 generated in step 3 in controller 100. Communication setting 400 and subscription 64 do not need to be generated in an installable format, but for example, may be output in a report format.

<C. Functional Configuration>

Figure 7:
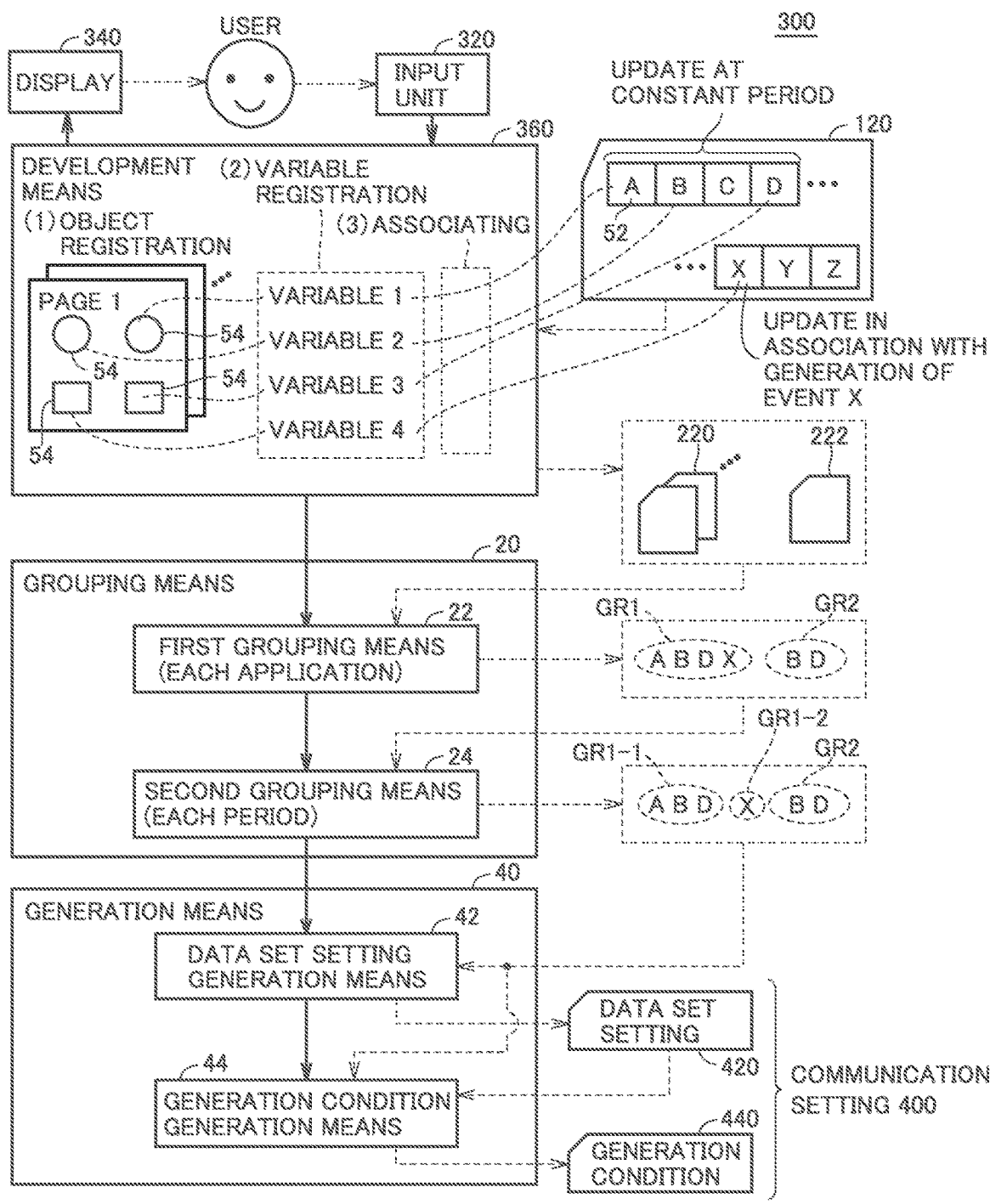
FIG. 7 is a block diagram illustrating a functional configuration of a support device 300.

FIG. 7 is a block diagram illustrating a functional configuration of support device 300. Support device 300 includes an input unit 320, a display 340, development means 360, grouping means 20, and generation means 40.

Input unit 320 receives the user operation. Typically, input unit 320 is a touch panel, a mouse, a keyboard, or the like. Development means 360 generates application 220 and mapping information 222 according to the user operation received by input unit 320.

Specifically, the user registers one or a plurality of objects 54 for each page to be produced ((1) object registration in FIG. 7). Subsequently, the user registers the arithmetic operation updating the display of object 54 and the variable used for the arithmetic operation for each of one or the plurality of objects 54 ((2) variable registration in FIG. 7). Finally, the user associates process data 52 that can be extracted from control program 120 with the registered variable ((3) association in FIG. 7). Thus, one or the plurality of applications 220, mapping information 222, and subscription 64 are generated. The application production procedure is an example, but is not limited to this order. For example, after the variable is associated with the process data, the application may be generated using the variable. In FIG. 7, a procedure for producing subscription 64 is not illustrated.

Development means 360 produces application 220 and mapping information 222 according to the information received by input unit 320, and provides a user interface necessary for producing the application through display 340.

Grouping means 20 includes first grouping means 22 and second grouping means 24. First grouping means 22 groups each of process data 52 included in mapping information 222 for each application based on mapping information 222 and application 220.

In the example of FIG. 7, it is assumed that the variables corresponding to process data A, B, D, X are used in application 1. The variables corresponding to process data B, D are used in application 2. That is, first grouping means 22 allocates process data A, B, D, X to group GR1, and allocates process data B, D to group GR2.

Second grouping means 24 further groups the groups allocated by first grouping means 22 for each period updated in controller 100. The period at which process data 52 is updated in controller 100 is defined by control program 120.

In the example of FIG. 7, it is assumed that process data A, B, D are updated every 100 ms in controller 100. It is assumed that process data X is updated in association with the generation of event X. That is, second grouping means 24 allocates process data A, B, D to a group GR1-1 and allocates process data X to a group GR1-2 for process data A, B, D, X allocated to group 1. In the example of FIG. 7, it is assumed that the update period of each process data 52 included in group GR2 in controller 100 are common.

Generation means 40 includes data set setting generation means 42 and generation condition generation means 44. Data set setting generation means 42 generates a data set setting 420 (see FIG. 5). Specifically, data set setting generation means 42 defines a combination of process data 52 such that process data 52 included in each group grouped by grouping means 20 is included in one data set 50.

Generation condition generation means 44 generates generation condition 440 (see FIG. 5). Specifically, the transmission condition is determined for each combination (data set) of process data 52 determined by data set setting generation means 42.

In the example of FIG. 7, process data A, B, D are stored in one data set 50, and data set setting 420 is generated such that process data X is stored in different data sets 50.

Generation condition generation means 44 determines the generation condition and the transmission condition of each data set defined in data set setting 420 based on data set setting 420 and the result of second grouping means 24.

In the example of FIG. 7, it is determined that data set 50 storing process data A, B, D is transmitted at the period of 100 ms and that data set 50 storing process data X is generated and transmitted as an event.

When a maximum transmission unit (MTU) is defined as the performance of information system network 2, grouping means 20 may repeat the division of the group until the total of the process data included in one group does not exceed the MTU.

In addition, generation means 40 may define the order in which process data 52 is stored according to the attribute of process data 52. The storing order is defined in the order in which controller 100 easily stores the data according to the performance of controller 100, the network configuration of controller 100, and the like.

<D. Hardware Configuration>

Figure 8:
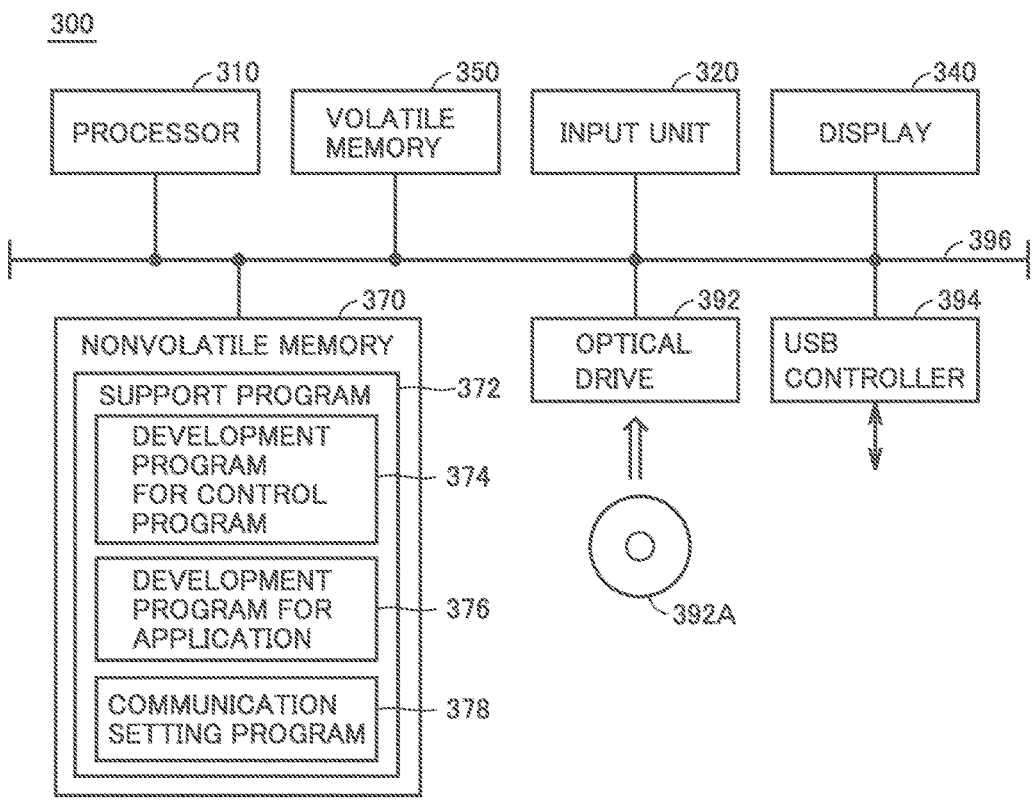
FIG. 8 is a schematic diagram illustrating an example of a hardware configuration of the support device 300.
Figure 9:
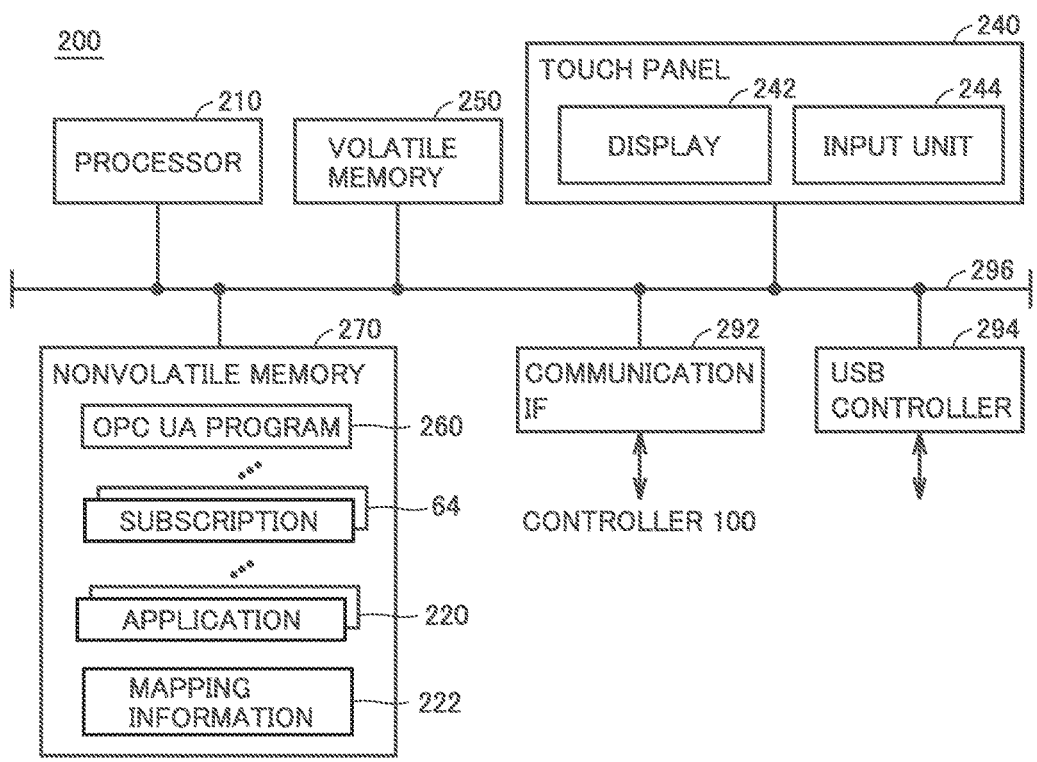
FIG. 9 is a schematic diagram illustrating an example of a hardware configuration of the HMI 200.
Figure 10:
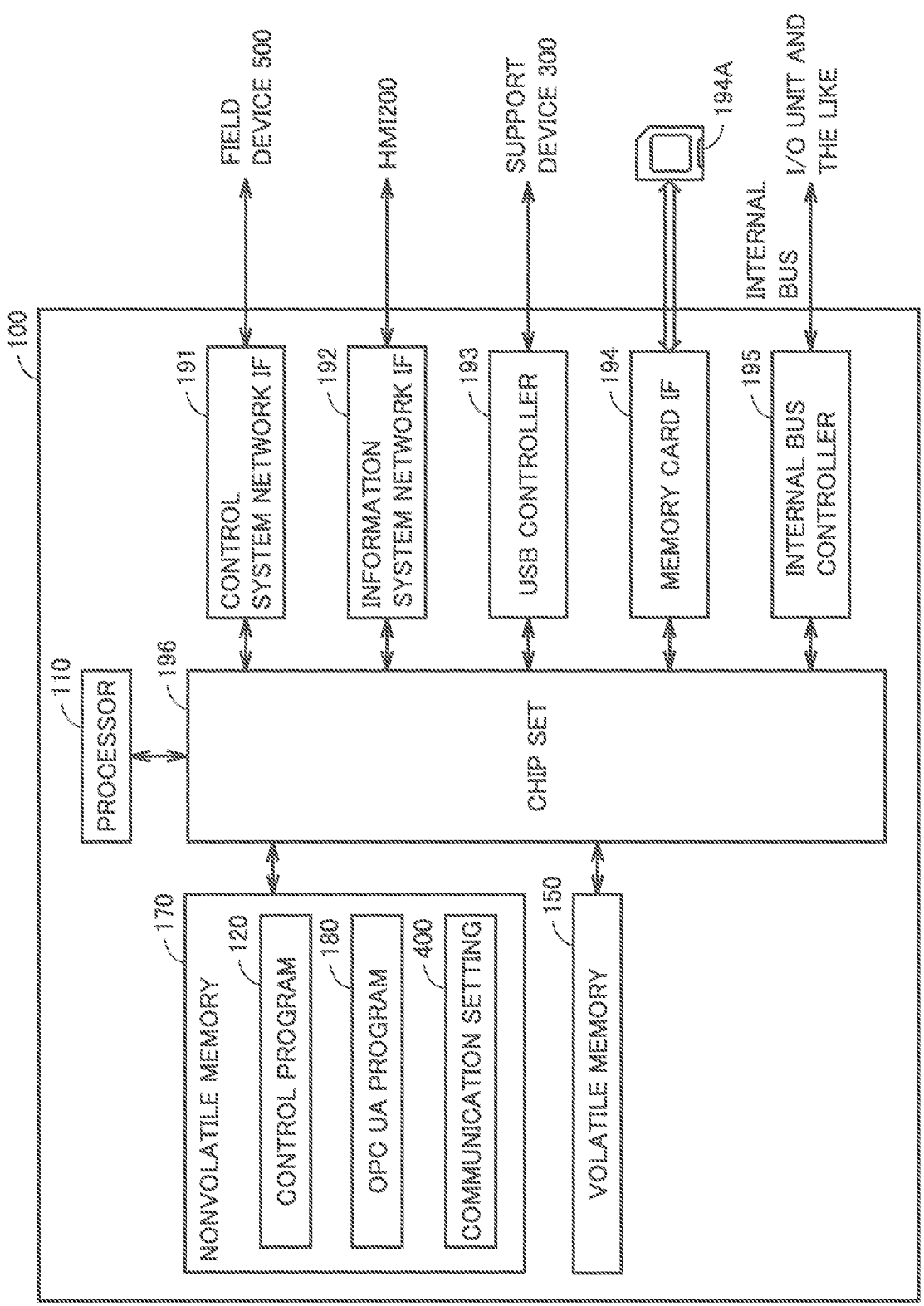
FIG. 10 is a schematic diagram illustrating an example of a hardware configuration of the controller 100.

With reference to FIGS. 8 to 10, hardware configurations of the devices included in control system 1 will be sequentially described. FIG. 8 is a schematic diagram illustrating an example of a hardware configuration of support device 300. FIG. 9 is a schematic diagram illustrating an example of a hardware configuration of HMI 200. FIG. 10 is a schematic diagram illustrating an example of a hardware configuration of controller 100.

<d1. Hardware Configuration of Support Device 300>

For example, support device 300 is implemented using hardware (for example, a general-purpose personal computer) according to a general-purpose architecture. Support device 300 may be a stationary type, or be provided in the form of a notebook personal computer having excellent portability at a manufacturing site where controller 100 is disposed. Referring to FIG. 8, support device 300 includes a processor 310, input unit 320, display 340, a volatile memory 350, a nonvolatile memory 370, an optical drive 392, and a universal serial bus (USB) controller 394. These components are connected through a processor bus 396.

Processor 310 includes a central processing unit (CPU), a graphical processing unit (GPU), or the like, and reads a program stored in nonvolatile memory 370, expands the program in volatile memory 350, and executes the program, thereby providing functions for producing and debugging control program 120 and application 220 and setting the communication environment between controller 100 and HMI 200 to the user.

Volatile memory 350 is configured by a dynamic random access memory (DRAM), a static random access memory (SRAM), or the like. Nonvolatile memory 370 is configured by a hard disk drive (HDD), a solid state drive (SSD), and the like.

Nonvolatile memory 370 stores a support program 372 providing the function as support device 300 in addition to an OS (not illustrated) implementing basic functions. Support program 372 includes a development program for control program 374 that provides the development environment of control program 120, a development program for application 376 that provides the development environment of application 220, and a communication setting program 378 that provides an environment setting a communication environment between controller 100 and HMI 200.

For example, when processor 310 executes development program for application 376, the function regarding development means 360 in FIG. 7 is provided. When processor 310 executes communication setting program 378, the functions regarding grouping means 20 and generation means 40 in FIG. 7 are provided.

Although the configuration example in which necessary functions are provided by processor 310 executing the program has been described, some or all of these provided functions may be implemented using a dedicated hardware circuit (for example, an application specific integrated circuit (ASIC), a field-programmable gate array (FPGA), or the like).

Input unit 320 and display 340 are as described with reference to FIG. 7.

Support device 300 includes optical drive 392, and a program stored in recording medium 392A (for example, an optical recording medium such as a digital versatile disc (DVD)) that non-transiently stores a computer-readable program is read and installed in nonvolatile memory 370 or the like.

Support program 372 and the like executed by support device 300 may be installed through computer-readable recording medium 392A, or installed by being downloaded from the server device or the like on the network. Sometimes functions provided by support device 300 of the first embodiment are implemented using a part of modules provided by the OS.

USB controller 394 is in charge of the data exchange with an arbitrary information processing device through the USB connection. Specifically, USB controller 394 is in charge of the data exchange with controller 100 or HMI 200.

(d2. Hardware Configuration of HMI 200)

As an example, HMI 200 is implemented using hardware (for example, a general-purpose personal computer) according to a general-purpose architecture. HMI 200 may be a stationary type or provided in the form of a notebook personal computer having excellent portability at a manufacturing site where controller 100 is disposed. Referring to FIG. 9, HMI 200 includes a processor 210, a touch panel 240, a volatile memory 250, a nonvolatile memory 270, a communication IF 292, and a USB controller 294. These components are connected to each other through a processor bus 296.

Processor 210 includes a CPU, a GPU, and the like, reads a program stored in nonvolatile memory 270, develops the program in the volatile memory 250, and executes the program, thereby outputting various types of information obtained by executing control program 120 to touch panel 240.

Volatile memory 250 is configured by a DRAM, an SRAM, or the like. For example, nonvolatile memory 270 is configured by an HDD or an SSD.

Nonvolatile memory 270 stores OPC UA program 260, one or the plurality of subscriptions 64, one or the plurality of applications 220, and mapping information 222 in addition to the OS (not illustrated) implementing the basic functions.

OPC UA program 260 is a program causing HMI 200 to function as the subscriber, and is a program performing the communication according to the OPC UA between controller 100 and HMI 200. Processor 210 executes OPC UA program 260 to provide the functions regarding OPC UA client 60 in FIG. 4. OPC UA program 260 is installed in non-volatile memory 270 from another external storage medium (for example, a memory card or a server device on a network).

Each of one or the plurality of subscriptions 64, one the plurality of applications 220, and mapping information 222 is produced under the environment provided by support device 300. Each of the data produced under the environment provided by support device 300 is typically installed in nonvolatile memory 270 through the USB connection. All or some of the data produced under the environment provided by support device 300 may be installed in nonvolatile memory 270 through another external storage medium (for example, a memory card or a server device on the network).

Although the configuration example in which the necessary functions are provided by processor 210 executing the program has been described, some or all of these provided functions may be mounted using a dedicated hardware circuit (for example, ASIC or FPGA). In addition, the function provided by HMI 200 may be implemented using a part of the module provided by the OS.

Touch panel 240 includes display 242 that is a display and input unit 244 that receives the user operation. Display 242 and input unit 244 may be configured separately.

Communication IF 292 is in charge of the data exchange with controller 100. USB controller 294 is in charge of the data exchange with arbitrary information processing device through USB connection. Specifically, USB controller 294 exchanges data with support device 300.

(b3. Hardware Configuration of Controller 100)

Referring to FIG. 10, controller 100 includes a processor 110, a chipset 196, a nonvolatile memory 170, a volatile memory 150, a control system network IF 191, an information system network IF 192, a USB controller 193, a memory card IF 194, and an internal bus controller 195 as main components.

Processor 110 is configured by a CPU, a GPU, and the like, and reads various programs stored in nonvolatile memory 170, develops the programs in volatile memory 150, and executes the programs, thereby implementing the control of field device 500 and the function as the publisher. A chipset 196 mediates the exchange of data between processor 110 and each component, thereby implementing the processing of controller 100 as a whole.

Nonvolatile memory 170 stores control program 120, OPC UA program 180, and communication setting 400.

Control program 120 is typically configured by a user program generated by the user who operates and designs support device 300 and a system program that provides basic functions of controller 100. The user program and the system program cooperate in implementing the control purpose in the user, thereby controlling field device 500.

OPC UA program 180 is a program causing controller 100 to function as the publisher, and is a program performing the communication according to the OPC UA between controller 100 and HMI 200. Processor 110 executes OPC UA program 180 to provide the functions regarding OPC UA server 80 in FIG. 5. For example, OPC UA program 180 may be previously installed in controller 100 as a type of the system program, or installed in nonvolatile memory 170 from another external storage medium (for example, memory card 194A and the server device on the network).

Communication setting 400 is generated under the environment provided by support device 300. Communication setting 400 and control program 120 generated by the user who operates and designs support device 300 are typically installed in nonvolatile memory 170 through the USB connection. All or some of the data produced under the environment provided by support device 300 may be installed in nonvolatile memory 170 through another external storage medium (for example, memory card 194A and a server device on the network).

Although the configuration example in which the necessary functions are provided by processor 110 executing the program has been described, some or all of these provided functions may be mounted using a dedicated hardware circuit (for example, ASIC or FPGA). In addition, the main part of controller 100 may be implemented using hardware (for example, an industrial personal computer based on a general-purpose personal computer) according to a general-purpose architecture. In this case, a plurality of OSs having different uses may be executed in parallel using a virtualization technology, and the necessary application may be executed on each OS.

Control system network IF 191 is in charge of the data exchange with field device 500.

Information system network IF 192 is in charge of the data exchange with HMI 200.

USB controller 193 is in charge of the data exchange with any information processing device through the USB connection. Specifically, USB controller 193 is in charge of the data exchange with support device 300.

Memory card IF 194 is configured such that memory card 194A is detachable, the data such as the control program and various settings can be written in memory card 194A, and the data such as the control program and various settings can be read from memory card 194A.

Internal bus controller 195 is an interface that exchanges the data with an I/O unit (not illustrated) mounted on controller 100. For the internal bus, a communication protocol unique to a manufacturer may be used, or a communication protocol that is the same as or compliant with any of industrial network protocols may be used.

<E. Modifications of Grouping>

In the first embodiment, HMI 200 is communicably connected to one controller 100. In addition, process data 52 used by one or the plurality of applications 220 is transmitted from one controller 100. In addition, grouping means 20 including first grouping means 22 and second grouping means 24 has been described.

HMI 200 may be communicably connected to a plurality of controllers 100. In this case, the one or the plurality of applications 220 may be configured to utilize the plurality of pieces of process data 52 transmitted from different controllers 100. Furthermore, in this case, grouping means 20 may group by a method different from the grouping method described with reference to FIG. 7.

Figure 11:
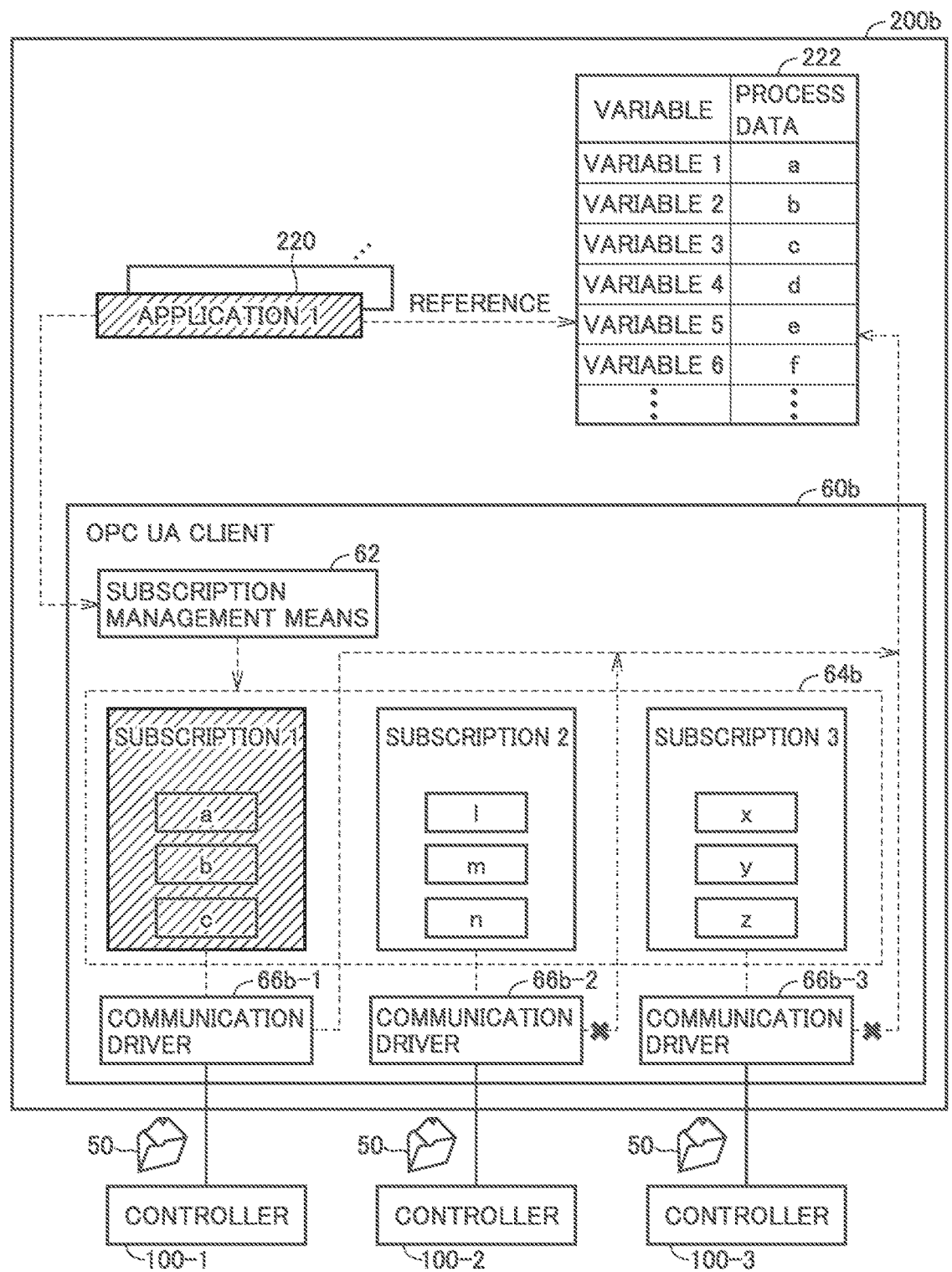
FIG. 11 is a view illustrating an execution stage of an application according to a modification.

With reference to FIG. 11, the execution stage of the application when application 220 is configured to use the plurality of pieces of process data 52 transmitted from different controllers 100 will be described. FIG. 11 is a view illustrating the execution stage of the application according to a modification. The configuration corresponding to the configuration included in HMI 200 according to the first embodiment described with reference to FIG. 4 is denoted by the same reference numeral as that in FIG. 4, and the description thereof is omitted.

HMI 200b is communicably connected to a plurality of controllers 100-1, 100-2, 100-3. HMI 200b includes an OPC UA client 60*b*. OPC UA client 60*b* includes communication drivers 66*b*-1, 66*b*-2, 66*b*-3 for each of connected controller 100-1, 100-2, 100-3.

Each subscription 64*b* is set such that process data 52 of the subscription target included in each subscription 64*b* is managed by common controller 100. Specifically, process data a, b, c included in subscription 1 are all process data 52 managed by controller 100-1. In addition, each of process data 1, m, n included in subscription 2 is process data 52 managed by controller 100-2. In addition, process data x, y, z included in subscription 3 are all process data 52 managed by controller 100-3.

When process data a, b, c are used for the execution of application 1, subscription 1 becomes the subscription target. In this case, only data set 50 sent from controller 100-1 is the subscription target, and data set 50 sent from controller 100-2 and controller 100-3 is not the subscription target.

Figure 12:
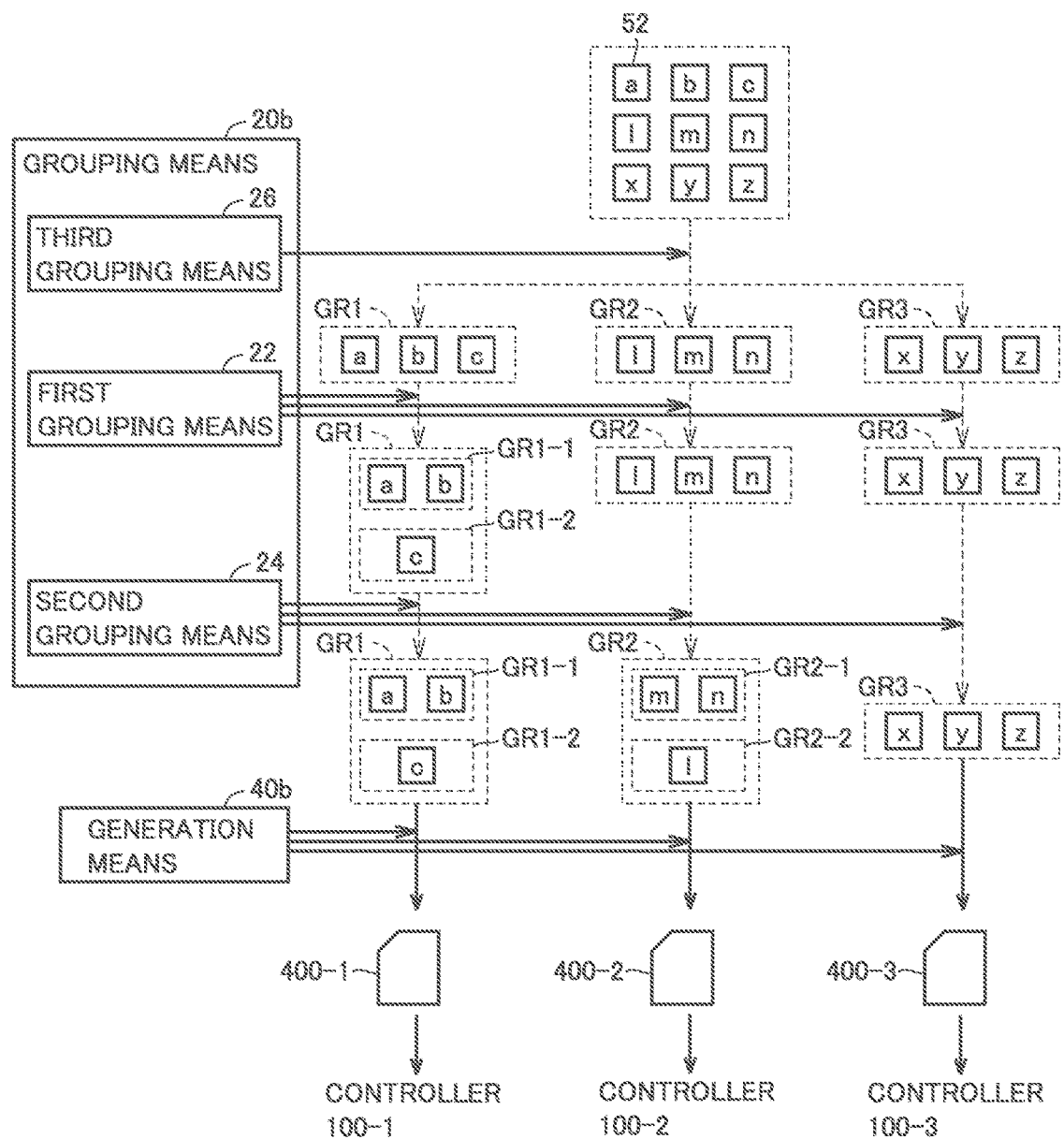
FIG. 12 is a schematic diagram illustrating grouping means 20b and generation means 40b according to a modification.

With reference to FIG. 12, a method for generating the communication setting when application 220 is configured to use the plurality of pieces of process data 52 transmitted from different controllers 100 will be described. FIG. 12 is a schematic diagram illustrating grouping means 20*b* and generation means 40*b* according to a modification. The configuration corresponding to the configuration included in HMI 200 of the first embodiment described with reference to FIG. 7 is denoted by the same reference numeral as that in FIG. 7, and the description thereof is omitted.

Grouping means 20*b* includes third grouping means 26 in addition to first grouping means 22 and second grouping means 24. Grouping means 20*b* advances the grouping in the order of third grouping means 26, first grouping means 22, and second grouping means 24.

Third grouping means 26 groups each of process data 52 used in the application for each controller 100 that manages process data 52. In the example of FIG. 12, process data a, b, c are the process data managed by controller 100-1, process data 1, m, n are the process data managed by controller 100-2, and process data x, y, z are the process data managed by controller 100-3. For this reason, third grouping means 26 allocates process data a, b, c to group GR1, allocates process data 1, m, n to group GR2, and allocates process data x, y, z to group GR3. Controller 100 that manages process data 52 is specified from control program 120 executed by each of controllers 100-1, 100-2, 100-3.

Then, first grouping means 22 further groups each group allocated by third grouping means 26 for each application. Because the execution contents of first grouping means 22 and second grouping means 24 are the same as those in FIG. 7, the description thereof is omitted.

Generation means 40*b* generates communication setting 400 for each of controllers 100-1, 100-2, 100-3. A communication setting 400-1 of controller 100-1 is generated such that process data 52 included in each group derived from group GR1 grouped by third grouping means 26 is stored in one data set 50. Similarly, a communication setting 400-2 of controller 100-2 is generated such that process data 52 included in each group derived from group GR2 grouped by third grouping means 26 is stored in one data set 50. A communication setting 400-3 of controller 100-3 is generated such that process data 52 included in each group derived from group GR3 grouped by third grouping means 26 is stored in one data set 50.

As described above, when managed controller 100 is different for each of the plurality of pieces of process data 52 included in the application, communication setting 400 needs to be generated for each controller. As in the modification, after each of the plurality of pieces of process data 52 is grouped for each controller 100 that manages process data 52, communication setting 400 is generated for each group, so that the communication setting can be generated for each of the plurality of controllers with less processing.

The control system of the first embodiment and the modifications can easily perform communication setting 400 in which process data 52 necessary for the execution of application 220 is transmitted from the controller to the HMI.

In the first embodiment and the modifications, support device 300 can collectively perform the application development and the communication setting. In the first embodiment and the modifications, support device 300 provides not only the development environment of the application and the environment of the communication setting but also the development environment of the control program. Accordingly, the communication setting can be easily implemented in consideration of the relationship between the application and the control program.

Second Embodiment

In the first embodiment, the environment in which communication setting 400 is generated is implemented by support device 300 that is the same as the environment in which application 220 is generated. The environment in which communication setting 400 is generated may be provided separately from the environment in which application 220 is generated. Specifically, the environment in which communication settings 400 is generated may be implemented by a dedicated setting device that generates communication settings 400.

<A. Configuration of Control System>

Figure 13:
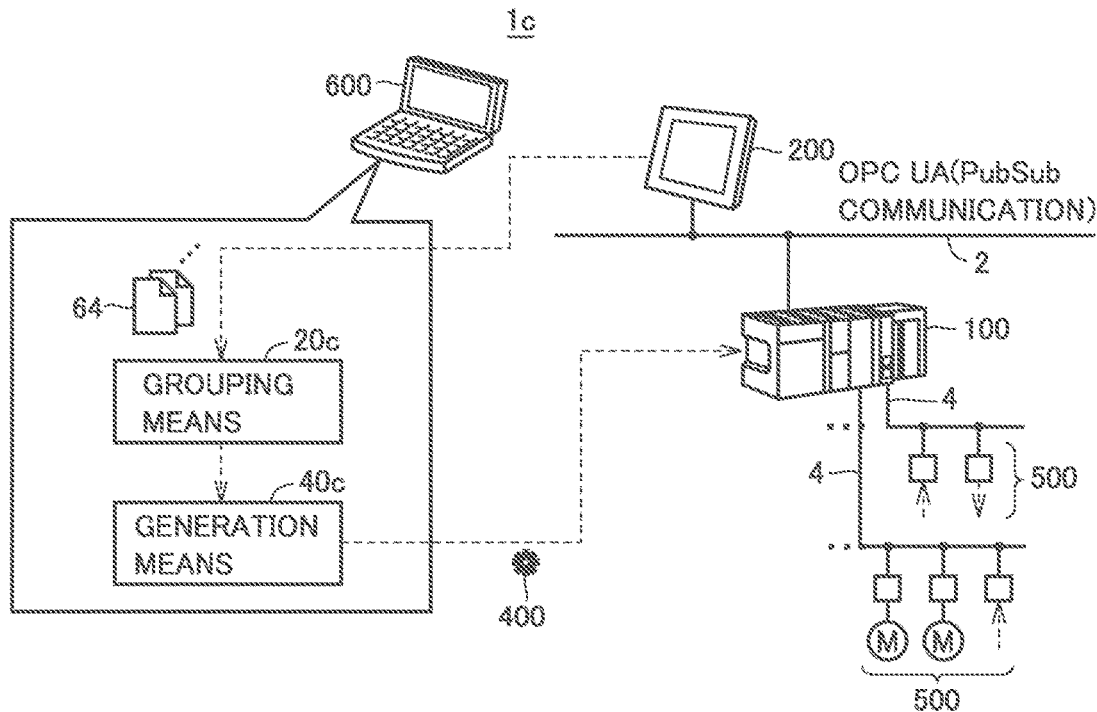
FIG. 13 is a view illustrating an outline of a control system 1c according to a second embodiment.

FIG. 13 is a view illustrating an outline of a control system 1*c* according to a second embodiment. Referring to FIG. 13, in the second embodiment, control system 1*c* includes controller 100, HMI 200, and a setting device 600. When control system 1 of the first embodiment is compared with control system 1*c* of the second embodiment, control system 1*c* is different from control system 1 in including setting device 600 instead of support device 300. It is assumed that application 220 and subscription 64 are already installed in HMI 200. In addition, it is assumed that control program 120 is already installed in controller 100.

Setting device 600 is communicably connected to HMI 200 through the USB connection or the like. Setting device 600 exports subscription 64 installed in HMI 200. Setting device 600 generates communication setting 400 based on subscription 64.

Setting device 600 is communicably connected to controller 100 through the USB connection or the like. Setting device 600 transmits communication setting 400 generated based on subscription 64 to controller 100.

Thus, the PubSub communication is established between controller 100 and HMI 200.

More specifically, setting device 600 includes grouping means 20*c* and generation means 40*c*. Grouping means 20*c* extracts process data 52 defined for the subscription target from each subscription 64 installed from HMI 200. Extracted process data 52 is grouped for each subscription 64. It is assumed that at least controllers 100 managed by one another are common to the plurality of pieces of process data 52 defined by one subscription 64.

Grouping means 20*c* may not group process data 52 for each subscription 64, and may group process data 52 by the method described in the first embodiment and the modification of the first embodiment.

Generation means 40c generates communication setting 400 according to the allocation result of grouping means 20c. Because the method by which generation means 40c generates communication setting 400 is the same as that in the first embodiment, the description thereof is omitted. Generation means 40c transmits generated communication setting 400 to corresponding controller 100.

<B. Hardware Configuration of Setting Device>

Figure 14:
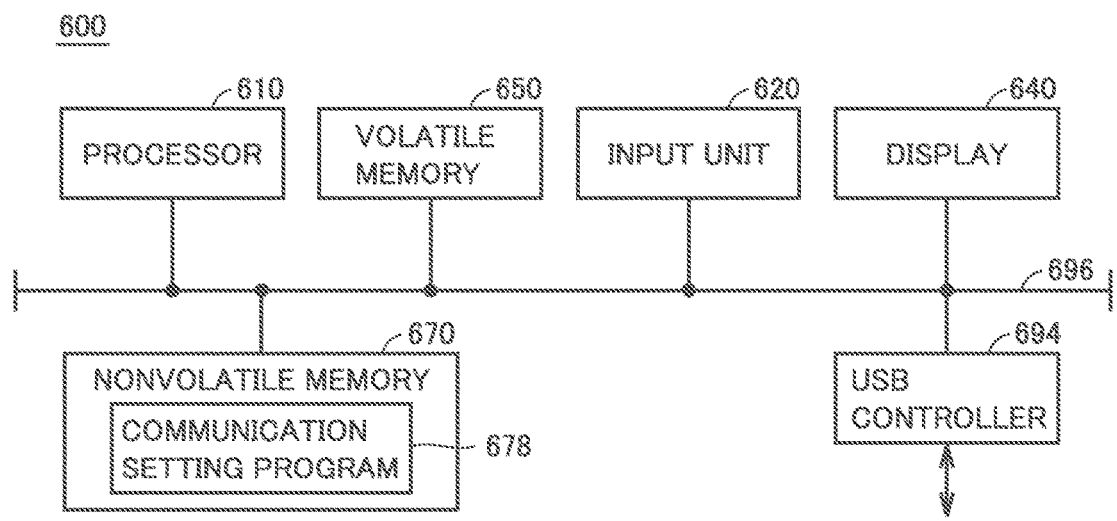
FIG. 14 is a schematic diagram illustrating an example of a hardware configuration of a setting device 600.

FIG. 14 is a schematic diagram illustrating an example of a hardware configuration of a setting device 600. As an example, setting device 600 is implemented using hardware (for example, a general-purpose personal computer) according to a general-purpose architecture. Setting device 600 may be a stationary type, or may be provided in the form of a notebook personal computer having excellent portability at a manufacturing site where controller 100 is disposed.

Referring to FIG. 14, setting device 600 includes a processor 610, an input unit 620, a display 640, a volatile memory 650, a nonvolatile memory 670, and a USB controller 694. These components are connected through a processor bus 696.

Processor 610 includes a CPU, a GPU, and the like, and reads a program stored in nonvolatile memory 670, develops the program in volatile memory 650, and executes the program, thereby providing the function for setting the communication environment between controller 100 and HMI 200 to the user.

Volatile memory 650 includes a DRAM, an SRAM, or the like. For example, nonvolatile memory 670 is configured by an HDD, an SSD, or the like.

Nonvolatile memory 670 stores a communication setting program 678 that provides an environment in which the communication environment is set between controller 100 and HMI 200 in addition to the OS implementing the basic functions.

For example, processor 610 executes communication setting program 678 to provide the above-described functions. Although the configuration example in which processor 610 executes the program to provide the necessary functions has been described, some or all of these provided functions may be implemented using a dedicated hardware circuit (for example, ASIC or FPGA).

Input unit 620 receives the user operation. Typically, input unit 320 is a touch panel, a mouse, a keyboard, or the like. Display 640 presents the information to the user. Typically, display 640 is a display.

Communication setting program 678 and the like may be installed through the computer-readable recording medium, or installed by being downloaded from the server device or the like on the network. In addition, the function provided by setting device 600 of the second embodiment may be implemented using a part of the module provided by the OS.

USB controller 694 is in charge of the data exchange with an arbitrary information processing device through the USB connection. Specifically, USB controller 694 is in charge of the data exchange with controller 100 or HMI 200.

<C. Modification of Control System 1c>

Assuming that subscription 64 is already installed in HMI 200, control system 1c of the second embodiment has been described. Setting device 600 may have the function of generating subscription 64. That is, setting device 600 may export application 220 and mapping information 222 from HMI 200, generate subscription 64 and communication setting 400 based on these pieces of information, and install each of subscription 64 and communication setting 400 in HMI 200 and controller 100. Setting device 600 may have only the function of generating communication setting 400 from application 220 and mapping information 222.

As described above, in the second embodiment and the modification, setting device 600 provides the function of supporting the communication environment between HMI 200 and controller 100. In this case, similarly to the first embodiment, communication setting 400 in which process data 52 necessary for executing application 220 is transmitted from controller 100 to HMI 200 can be easily performed.

In addition, setting device 600 provides the function of supporting the communication environment between HMI 200 and controller 100, so that the setting device can be easily introduced to the site where the development environment of the application and the development environment of the control program have already been introduced.

Third Embodiment

In the first embodiment and the second embodiment, communication setting 400 is generated before the communication is started between HMI 200 and controller 100. Communication setting 400 may be set when the subscription request is made from HMI 200 that is of the subscriber after the communication is started between HMI 200 and controller 100. A third embodiment illustrates an example in which communication setting 400 is set when the subscription request is made from HMI 200.

<A. Configuration of Control System 1d>

Figure 15:
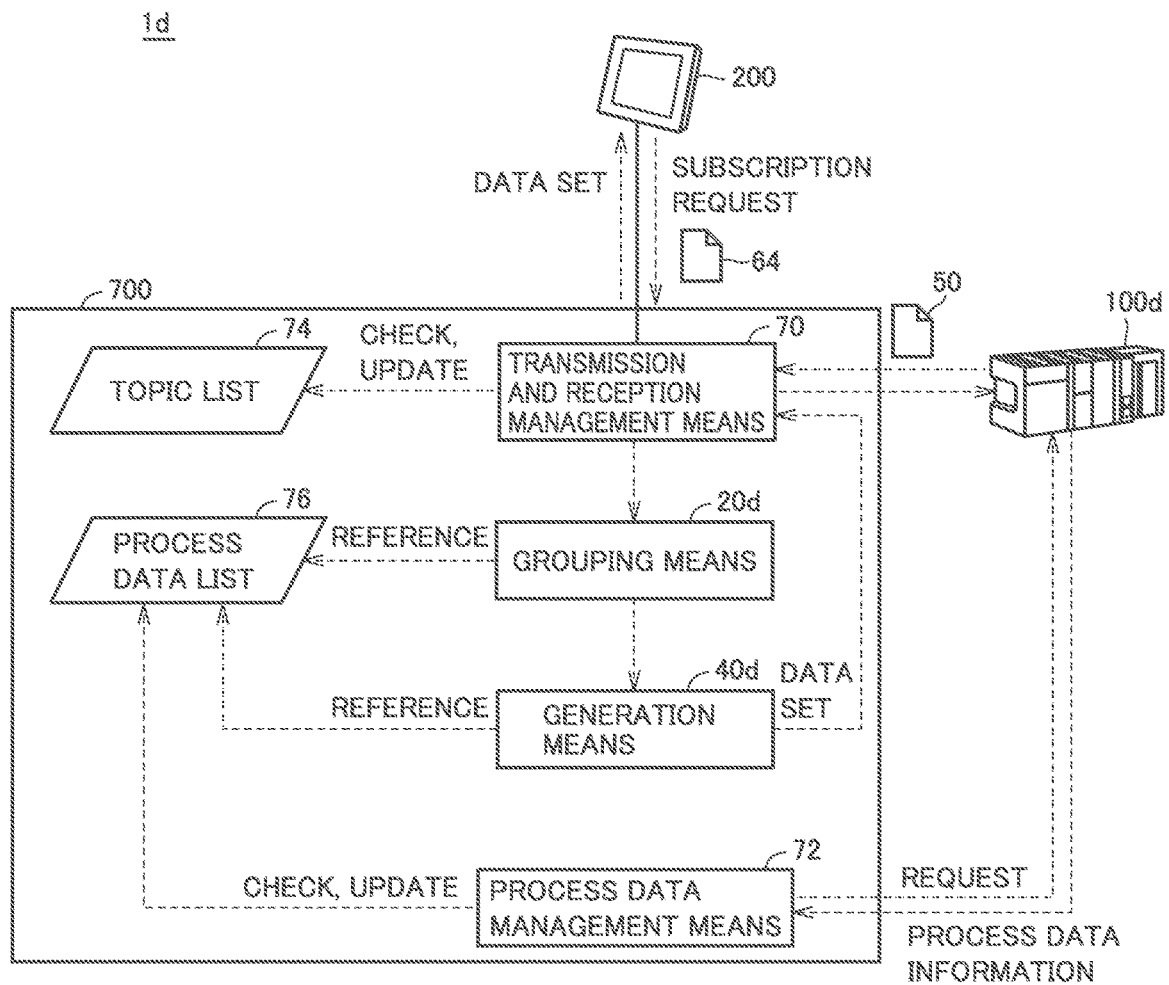
FIG. 15 is a view illustrating a control system 1d according to a third embodiment.

FIG. 15 is a view illustrating a control system 1d according to a third embodiment. Referring to FIG. 15, control system 1d includes a controller 100d, HMI 200, and a relay device 700. Control system 1 of the first embodiment is different from control system 1d of the third embodiment in that control system 1d includes a controller 100d instead of controller 100 and a relay device 700 instead of support device 300. It is assumed that application 220 and subscription 64 are already installed in HMI 200. In addition, it is assumed that control program 120 is already installed in controller 100d.

Relay device 700 includes transmission and reception management means 70 and process data management means 72 in addition to grouping means 20d and generation means 40d.

Upon receiving the subscription request from HMI 200, transmission and reception management means 70 transmits data set 50 delivered from controller 100d to HMI 200 so as to satisfy the subscription request. Specifically, transmission and reception management means 70 refers to topic list 74 in which subscription 64 of HMI 200 and data set 50 delivered from controller 100d are associated with each other, thereby selecting data set 50 satisfying the subscription request from among the plurality of types of data sets 50 delivered from controller 100d and transmitting the selected data set 50 to HMI 200.

When referring to topic list 74 to determine that the subscription request from HMI 200 cannot be satisfied, transmission and reception management means 70 requests grouping means 20d and generation means 40d to execute the processing generating communication setting 400 such that data set 50 satisfying the subscription request of HMI 200 is distributed from controller 100d.

Grouping means 20d allocates one or the plurality of pieces of process data 52 included in subscription 64 from HMI 200 to one or the plurality of groups by referring to process data list 76 that defines correspondence between process data 52 and controller 100d that delivers process data 52. Although the third embodiment illustrates the example in which one controller 100d is communicably connected to HMI 200, grouping means 20d distributes at least process data 52 for each controller when a plurality of controllers are communicably connected to HMI 200.

Process data list 76 is managed by process data management means 72. When communication between relay device 700 and controller 100d is established, process data management means 72 requests controller 100d to transmit the information indicating managed process data 52. Upon receiving the information indicating process data 52 (process data information in FIG. 15), process data management means 72 checks whether the correspondence between controller 100d and process data 52 managed by controller 100d is registered in process data list 76. When the correspondence is not registered, process data management means 72 registers the correspondence between controller 100d and process data 52 managed by controller 100d in process data list 76.

For example, grouping means 20d allocates one or the plurality of pieces of process data 52 included in subscription 64 to one or the plurality of groups such that the total of the process data included in one group does not exceed the communication performance of controller 100d.

Generation means 40d defines a combination of process data 52 stored in one data set 50 according to the allocation result. Generation means 40d requests controller 100d to store the defined combination of process data 52 in one data set 50 and to transmit the defined combination of process data 52 to controller 100d.

In addition, generation means 40d notifies transmission and reception management means 70 of the defined result. Transmission and reception management means 70 registers the result defined by generation means 40d in the topic list 74 with respect to subscription 64 of HMI 200.

Relay device 700 newly defines data set 50 every time the new subscription request is made. Controller 100d updates communication setting 400 so as to transmit newly defined data set 50. Furthermore, when data set 50 is newly defined, relay device 700 updates topic list 74. Furthermore, when a controller is newly connected, relay device 700 updates process data list 76.

<B. Sequence>

Figure 16:
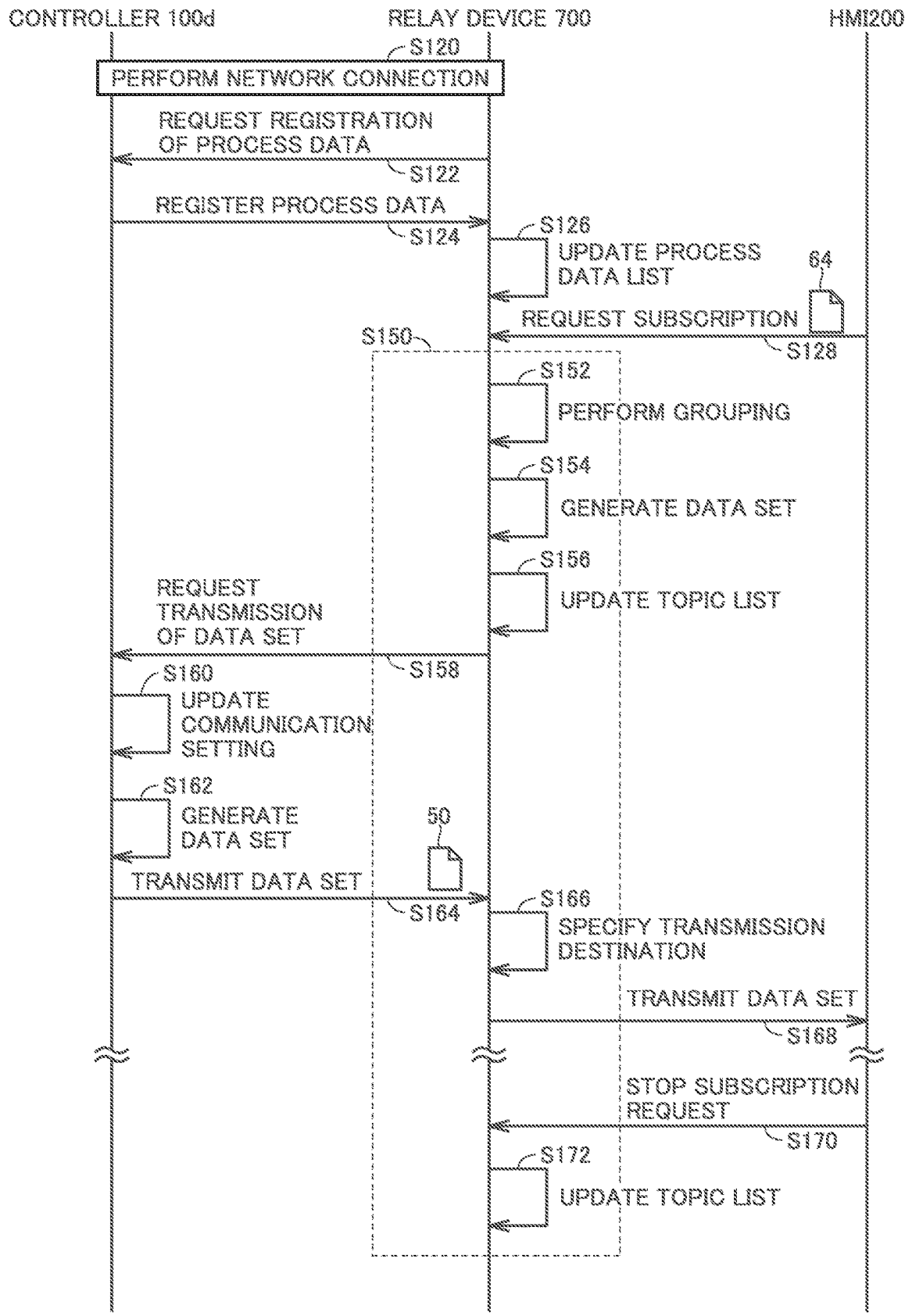
FIG. 16 is a sequence diagram illustrating a flow from start of communication between a relay device 700 and a controller 100d to transmission of a communication setting 400 to the controller 100d.

FIG. 16 is a sequence diagram illustrating a flow from the start of the communication between relay device 700 and controller 100d to the transmission of communication setting 400 to controller 100d. Hereinafter, "step" is simply referred to as "S".

In step S120, it is assumed that relay device 700 and controller 100d are network-connected.

In S122, relay device 700 requests controller 100 to register process data 52.

In S124, controller 100d receives the request and registers process data 52.

In S126, relay device 700 updates process data list 76.

When the subscription request is made from HMI 200 (S128), relay device 700 starts the processing for transmitting the data set to HMI 200 (S150).

In S152, relay device 700 allocates process data 52 included in subscription 64 to one or the plurality of groups according to process data list 76.

For example, process data 52 included in subscription 64 is allocated for each period updated by controller 100d. In addition, process data 52 included in subscription 64 is allocated such that the total of the process data included in one group does not exceed the communication performance of controller 100d.

In S154, relay device 700 defines the combination of process data 52 stored in one data set 50 according to the allocation result.

In S156, relay device 700 updates topic list 74. In S158, controller 100 is requested to transmit the data set generated in S154. The transmission request of the data set corresponds to communication setting 400.

Controller 100d updates communication setting 400 in response to the request (S160). Controller 100d generates and transmits the data set according to updated communication setting 400 (S162, S164).

In S166, relay device 700 specifies HMI 200 that transmits transmitted data set 50 according to topic list 74. In S168, relay device 700 transmits the data set to the specified transmission destination (HMI 200).

Then, when the subscription request is stopped from HMI 200 (S170), relay device 700 updates topic list 74 (S172) and stops the transmission of the data set transmitted from controller 100d to HMI 200. Thus, the processing of transmitting the data set in response to one subscription request of relay device 700 (S150) ends.

It is assumed that controller 100d continues to transmit the process data even when the subscription request is stopped from HMI 200.

Relay device 700 refers to topic list 74 every time the subscription request is made, and determines whether process data 52 of the subscription target defined by subscription 64 is distributed. For example, in topic list 74, the combination of data sets satisfying the subscription request defined by subscription 64 is defined for each subscription 64. Relay device 700 refers to topic list 74 and determines whether subscription 64 for which the subscription request is made is registered in topic list 74.

When subscription 64 for which the subscription request is made is registered in topic list 74, relay device 700 updates topic list 74 so as to transmit one or the plurality of types of data sets satisfying the subscription request specified by subscription 64 for which the subscription request is made, to HMI 200 that makes the subscription request.

When subscription 64 to which the subscription request is made is not registered in topic list 74, relay device 700 specifies the data set including process data 52 of the subscription target defined by subscription 64 for which the subscription request is made in the data sets registered in topic list 74. Then, relay device 700 excludes process data 52 included in the specified data set from subscription 64, defines the grouping and the data set, requests controller 100d to generate and transmit defined data set 50, and updates topic list 74.

Specifically, it is assumed that data set 1 including process data a, b and data set 2 including process data a, f are already registered in topic list 74. In this case, it is assumed that the process data included in newly requested subscription 64 is process data a, b, c, d. At this point, relay device 700 registers requested subscription 64 and data set 1 in topic list 74 while subscription 64 and data set 1 are associated with each other. In addition, process data c, d are targets of the grouping and generation of the data set. For example, when it is determined that process data c, d are generated as one data set 3, relay device 700 registers requested subscription 64 and data set 3 in topic list 74 while subscription 64 and data set 3 are associated with each other.

Thus, data set 1 and data set 3 are registered in topic list 74 while data set 1 and data set 3 are associated with requested subscription 64. Relay device 700 refers to topic list 74 to deliver data set 1 and data set 3 to HMI 200 that requests subscription 64.

That is, relay device 700 can distribute the data set toward HMI 200 so as to satisfy the request by updating topic list 74 every time subscription 64 is newly requested.

<C. Hardware Configuration of Relay Device>

Figure 17:
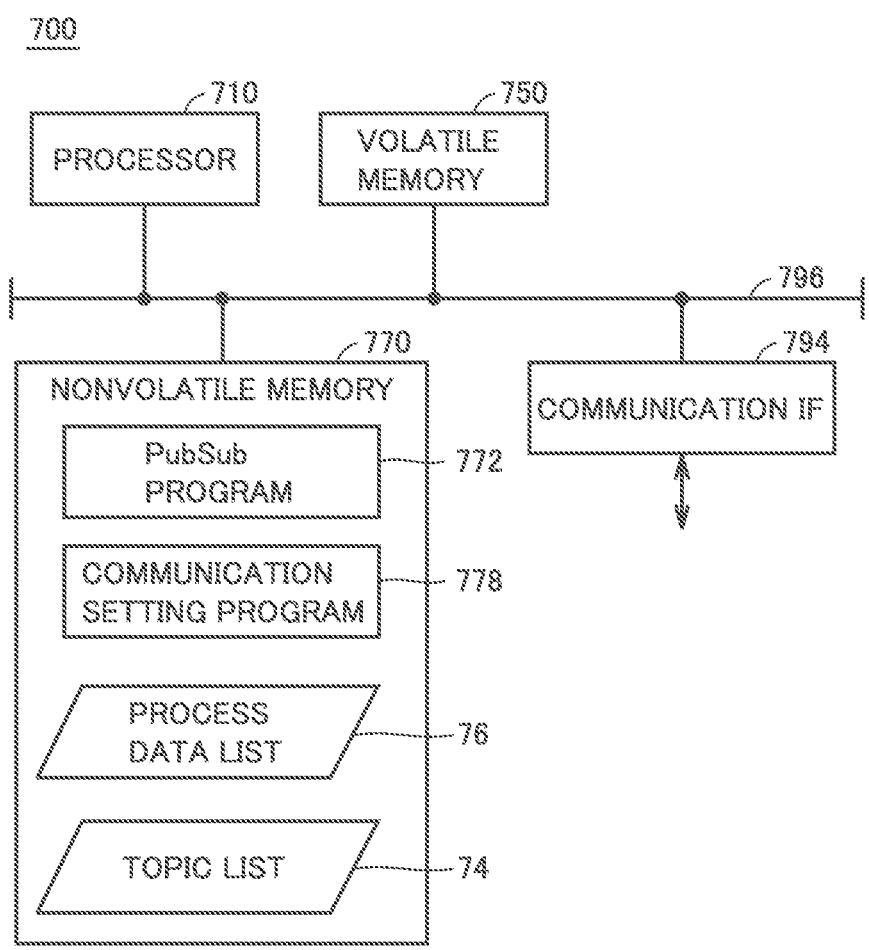
FIG. 17 is a schematic view illustrating an example of a hardware configuration of the relay device 700.

FIG. 17 is a schematic view illustrating an example of a hardware configuration of relay device 700. Referring to FIG. 17, relay device 700 includes a processor 710, a volatile memory 750, a nonvolatile memory 770, and a communication IF 794. These components are connected to each other through a processor bus 796.

Processor 710 includes a CPU, a GPU, and the like, and reads a program stored in the nonvolatile memory 770, develops the program in volatile memory 750, and executes the program, thereby providing the function of relaying the communication between controller 100 and HMI 200.

Volatile memory 750 is configured by a DRAM, an SRAM, or the like. For example, nonvolatile memory 770 is configured by an HDD, an SSD, or the like.

Nonvolatile memory 770 includes a communication setting program 778 that provides the environment in which the communication environment is set between controller 100 and HMI 200, a PubSub program 772 that manages various lists relaying the communication between controller 100 and HMI 200 to implement the PubSub communication, topic list 74, and process data list 76 in addition to the OS implementing the basic functions.

For example, processor 710 executes communication setting program 778 to provide the functions of grouping means 20d and generation means 40d in FIG. 15. Processor 710 executes PubSub program 772 to provide the functions of transmission and reception management means 70 and process data management means 72 in FIG. 15. Although the configuration example in which processor 710 executes the program to provide the necessary functions has been described, some or all of these provided functions may be implemented using a dedicated hardware circuit (for example, ASIC or FPGA).

Various programs stored in nonvolatile memory 770 may be installed through the computer-readable recording medium, or installed by being downloaded from the server device or the like on the network. Sometimes functions provided by relay device 700 of the third embodiment are implemented using a part of modules provided by the OS.

Communication IF 794 is in charge of the data exchange with controller 100d and the data exchange with HMI 200.

(D. Modifications)

The example in which subscription 64 is previously installed in HMI 200 has been described in the third embodiment. HMI 200 only needs to be able to specify process data 52 used for application 220 of the execution target, but is not limited to management by subscription 64.

Furthermore, in the third embodiment, the example in which HMI 200 and controller 100d are connected on a one-to-one basis through relay device 700 has been described. However, a plurality of HMIs 200 and a plurality of controllers 100d may be communicably connected through relay device 700.

In addition, the example in which relay device 700 relays the data set transmitted by controller 100d and transmits data set 50 to HMI 200 has been described. However, relay device 700 may be configured to extract process data 52 included in data set 50 transmitted from controller 100d, generate a new data set again, and transmit the data set to HMI 200. In this case, relay device 700 previously notifies HMI 200 of the information capable of specifying process data 52 included in the data set transmitted from relay device 700 to HMI 200, or writes the information in a header of the data set.

As described above, in the third embodiment and the modifications, relay device 700 provides the support function of the communication environment between HMI 200 and controller 100d. In this case, similarly to the first embodiment, communication setting 400 in which process data 52 necessary for executing application 220 is transmitted from the controller to the HMI can be easily performed.

In addition, because relay device 700 provides the support function of the communication environment between HMI 200 and controller 100d, the data exchange can be implemented between HMI 200 and controller 100d without previously installing communication setting 400 in controller 100d. In addition, even when a new HMI or controller joins in or leaves from the network configured by HMI 200 and controller 100d, communication setting 400 corresponding to such joining or leaving can be performed without stopping the communication between the existing HMI and the controller.

Fourth Embodiment

In the first to third embodiments, information system network 2 is the network conforming to the OPC UA. Even when information system network 2 is a network conforming to EtherNET/IP (registered trademark), the data link between the HMI and the controller is required. Setting the data link is also referred to as establishing the connection. In a fourth embodiment, the communication setting when the network conforming to EtherNET/IP (registered trademark) is used instead of information system network 2 will be described.

<A. Configuration of Control System 1e>

Figure 18:
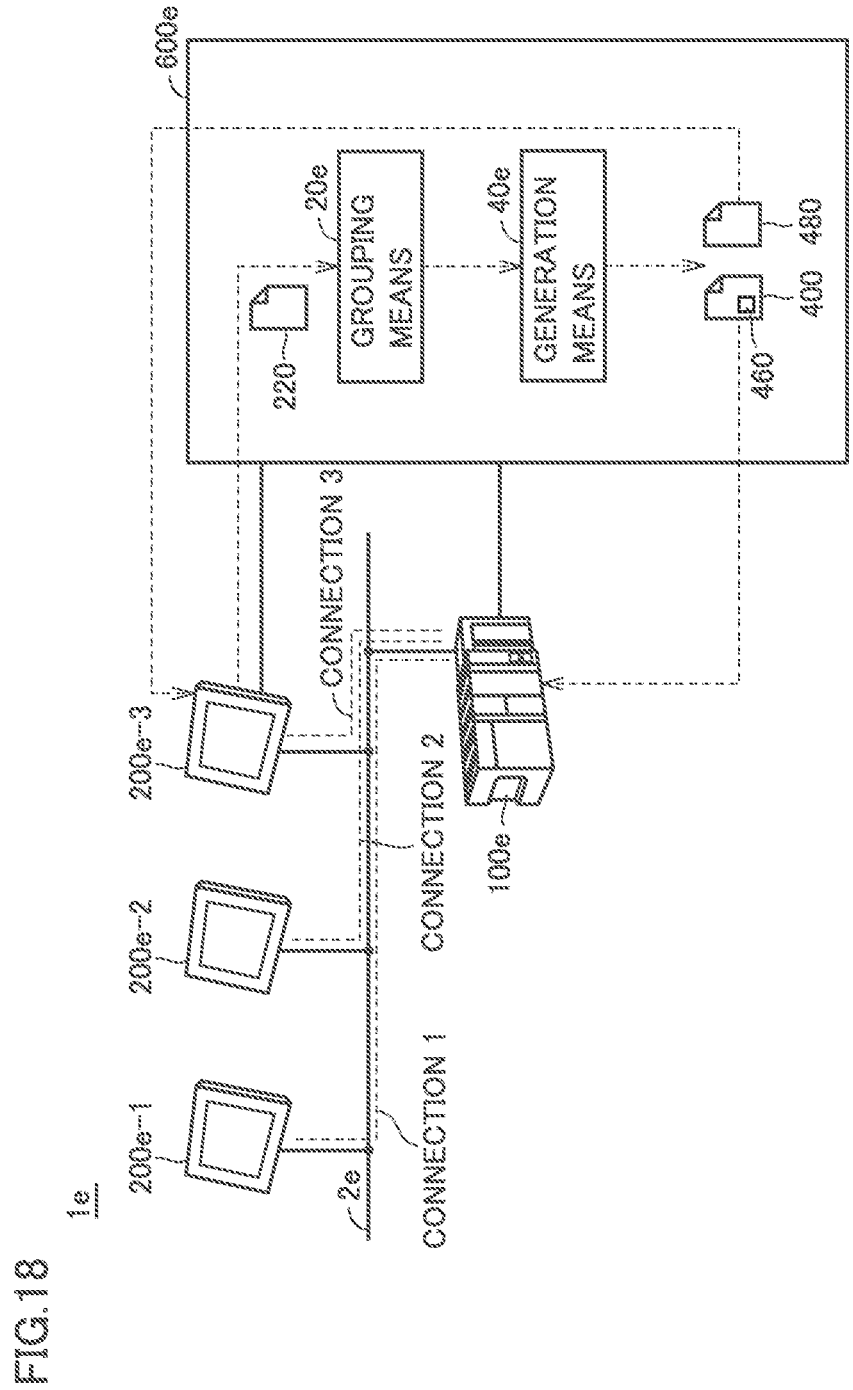
FIG. 18 is a view illustrating a control system 1e according to a fourth embodiment.

FIG. 18 is a view illustrating a control system 1e of the fourth embodiment. Referring to FIG. 18, control system 1e includes a controller 100e, a plurality of HMIs 200e-1, 200e-3, 200e-3 (hereinafter, also generally referred to as an HMI 200e), and a setting device 600e.

Controller 100e and the plurality of HMIs 200e are communicably connected to each other by an information system network 2e conforming to EtherNET/IP.

The example of FIG. 18 illustrates the state in which the data link between HMI 200e-3 and controller 100e is set through setting device 600e and a connection 3 is established.

Setting device 600e includes grouping means 20e and generation means 40e. Setting device 600e refers to application 220 included in HMI 200e-3 and specifies the plurality of pieces of process data 52 used in application 220.

Grouping means 20e distributes the plurality of specified process data 52 into one or the plurality of groups. The allocation method can be performed from the same viewpoint as that described in the first to third embodiments.

Generation means 40e sets communication setting 400 such that process data 52 included in one group is stored in one data set 50 according to the allocation result. In addition to data set setting 420 (information defining process data 52 stored in one data set 50) and generation condition 440 (information defining the condition that generates data set 50), communication setting 400 includes storage information 460 defining the order in which process data 52 is stored.

In addition, generation means 40e generates connection information 480 capable of specifying which process data 52 is stored in which place for each data set 50.

Setting device 600e installs connection information 480 in HMI 200e-3, and installs communication setting 400 in controller 100e. Setting device 600e may produce connection information 480 and communication setting 400 for each application 220, or produce one for the plurality of applications 220. Although setting device 600e installs connection information 480 in HMI 200e-3 and installs communication setting 400 in controller 100e, these pieces of information may be output as a report.

Setting device 600e generates communication setting 400 and connection information 480 for each of the HMIs 200e-1, 200e-2, 200e-3. Connection 1 to 3 is established by installing communication setting 400 generated by setting device 600e in controller 100e and installing connection information 480 in each of HMIs 200e-1, 200e-2, 200e-3.

In addition, when each of the plurality of pieces of process data 52 used for application 220 executed in one HMI 200e is managed by separate controller 100e, connection information 480 and communication setting 400 are generated for each controller 100e.

<B. Data Structure and Connection Information 480 of Data Set 50>

Figures 19, 20:
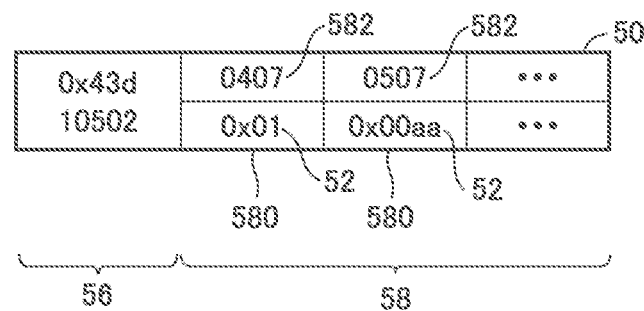
FIG. 19 is a view illustrating an example of a data structure of a data set 50.
FIG. 20 is a view illustrating connection information 480.

With reference to FIGS. 19 and 20, the data structure of data set 50 generated by controller 100e and connection information 480 referred to by HMI 200e to interpret data set 50 will be described.

FIG. 19 is a view illustrating an example of the data structure of data set 50. FIG. 20 is a view illustrating connection information 480.

Referring to FIG. 19, ConnectionID 56 is assigned to each data set 50. In addition, data set 50 has a storage region 58 including a plurality of storage units 580. A sequence number 582 is allocated to each storage unit 580, and process data 52 is stored in each storage unit 580.

Referring to FIG. 20, connection information 480 is information indicating which process data is stored in each storage unit 580. Specifically, connection information 480 is information in which a sequence number and a type of process data stored in the storage unit of the sequence number are associated for each ConnectionID.

HMI 200 interprets data set 50 transmitted from controller 100e based on connection information 480, extracts process data 52, and executes application 220.

<C. Modification>

The method for establishing the connection is not limited to the method in which setting device 600e is used. As described in the first and third exemplary embodiments, the connection between the HMI and the controller may be established using the support device or the relay device.

As described above, in the fourth embodiment and the modification, because the connection between the HMI and the controller is automatically established based on the application which is executed, communication setting 400 in which process data 52 necessary for the execution of application 220 is transmitted from the controller toward the HMI can be easily performed. In addition, because the data transmitted from the controller toward the HMI is limited to the process data necessary for the application, the unnecessary data does not need to be transmitted.

In addition, in the fourth embodiment and the modification, because setting device 600e generates storage information 460, controller 100e does not need to determine the storage order each time data set 50 is generated, and the processing load of generating data set 50 of controller 100e can be reduced. Further, because connection information 480 corresponding to storage information 460 is transmitted to HMI 200, a data link can be easily constructed between controller 100e and HMI 200.

[Other Modifications]

In the first to fourth embodiments described above, the HMI has the function of the subscriber, and the controller has the function of the publisher. Each control system described in the first to fourth embodiments may be configured to distribute information from the HMI to the controller according to the predetermined communication setting of the HMI. Also in this case, similarly to the first to fourth embodiments, the communication setting generating the information distributed by the HMI may be generated according to the control program.

Figure 21:
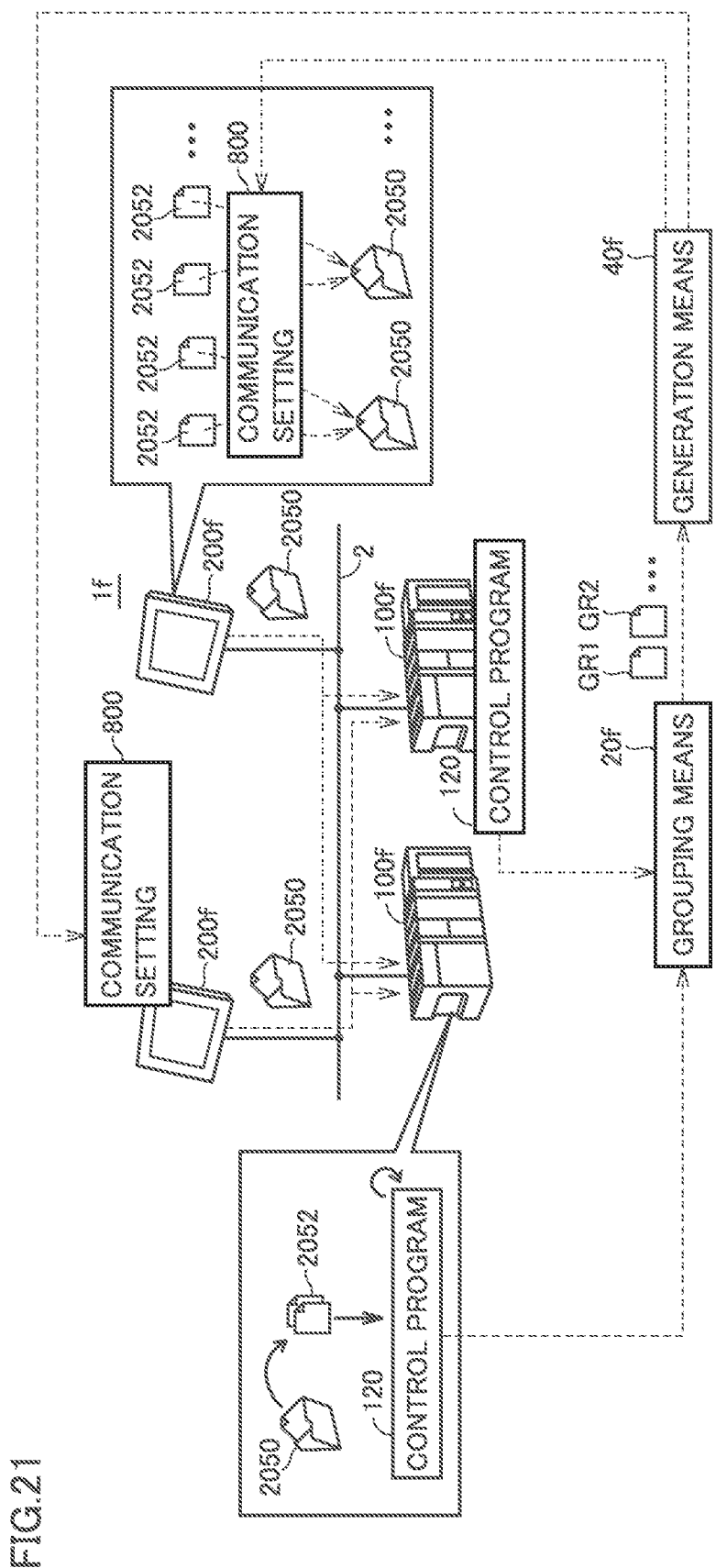
FIG. 21 is a schematic diagram illustrating an outline of a control system 1f according to a modification.

FIG. 21 is a schematic diagram illustrating an outline of a control system 1f according to a modification. The contents regarding the distribution of the information from the controller to the HMI described in the first to fourth embodiments are omitted in FIG. 21.

Referring to FIG. 21, control system 1f includes a plurality of controllers 100f, a plurality of HMIs 200f, grouping means 20f, and generation means 40f. In FIG. 21, the display of field device 500 connected to each controller 100f is omitted.

HMI 200f stores application data 2052 referred to or updated in application 220 in one or a plurality of types of application data sets 2050 according to a predetermined communication setting 800, and distributes application data 2052.

For example, application data 2052 includes process data 52, the data output as the execution result of application 220, and a control value controlling controller 100f input according to the user operation.

For example, the distribution of application data set 2050 from HMI 200f to controller 100f is performed when the user operates HMI 200f to control controller 100f, or when transmitted process data 52 is returned to controller 100f.

Controller 100f executes control program 120 using previously designated application data 2052. Here, application data 2052 corresponds to the process data from the viewpoint of controller 100f, and corresponds to the data distributed from HMI 200 in the process data.

For example, control program 120 is produced under the development environment provided by support device 300 described with reference to FIG. 2.

Grouping means 20f allocates application data 2052 designated to be used in control program 120 to one or the plurality of groups. The method described in the above embodiments can be used as the grouping method. Grouping means 20f may acquire application data 2052 from each of control programs 120 of the plurality of controllers 100f, and group acquired application data 2052.

Generation means 40f generates communication setting 800 such that application data 2052 allocated to each of the plurality of groups GR1, GR2, . . . grouped by grouping means 20f is stored in one application data set 2050 and transmitted according to the allocation result of grouping means 20f.

That is, when application data 2052 is used to execute control program 120, communication setting 800 in which application data 2052 necessary for the execution of control program 120 is transmitted from HMI 200f to controller 100f can be easily performed according to control program 120.

Although not illustrated in FIG. 21, grouping means 20f and generation means 40f may produce communication setting 400 of controller 100f.

Grouping means 20f and generation means 40f can be implemented by the support device, the setting device, and the relay device described in the first to third embodiments.

Furthermore, the communication between HMI 200f and controller 100f is not limited to the OPC UA, but may be communication conforming to EtherNET/IP (registered trademark) as described in the fourth embodiment.

§ 3 APPENDIX

As described above, the first to third embodiments and the modifications include the following disclosure.

<Configuration 1>

A control system including: a control device (100, 100a, 100d, 100e, 1000 configured to execute a control program (120) controlling a control target (500) while managing a plurality of pieces of process data (52) referred to or updated in the control program, the control device being configured to transmit one or a plurality of types of data sets (50) storing at least a part of the plurality of pieces of process data according to a predetermined communication setting (400); an information processing device (200, 200a, 200b, 200e, 200f) configured to execute one or a plurality of applications (220) using one or a plurality of pieces of process data designated in the plurality of pieces of process data by using the one or the plurality of types of data sets transmitted from the control device; a grouping unit (20, 20a, 20b, 20c, 20d, 20e, 20f) configured to allocate each of the one or the plurality of pieces of process data designated to be used in the one or the plurality of applications to one or a plurality of groups; and a generation unit (40, 40a, 40b, 40c, 40d, 40e, 400 configured to generate the communication setting for the control device such that the one or the plurality of pieces of process data allocated to the group are stored in one data set and transmitted for each of the one or the plurality of groups grouped by the grouping unit according to an allocation result of the grouping unit.

<Configuration 2>

The control system described in configuration 1, in which the communication setting includes information (420) specifying the one or the plurality of pieces of process data to be stored in each data set.

<Configuration 3>

The control system described in configuration 1 or 2, in which the communication setting includes information (460) specifying storage order of the one or the plurality of pieces of process data in each data set.

<Configuration 4>

The control system described in any one of configurations 1 to 3 further including a support device (300) configured to provide a development environment of the one or more applications, in which the support device includes the grouping unit (20, 20b) and the generation unit (40, 40b).

<Configuration 5>

The control system described in any one of configurations 1 to 3 further including a relay device (700) configured to relay communication between the control device and the information processing device, in which the relay device includes the grouping unit (20d) and the generation unit (40d).

<Configuration 6>

The control system described in any one of configurations 1 to 5, in which the information processing device (2000 manages a plurality of application data (2052) referred to or updated in the one or the plurality of applications, and transmits one or a plurality of types of application data sets (2050) storing at least a part of the plurality of application data according to the predetermined communication setting (800) of the information processing device, the control device (1000 is capable of executing the control program using the one or the plurality of application data designated in the plurality of application data using the application data set, the grouping unit (200 allocates each of the one or the plurality of application data designated to be used in the control program to one or a plurality of control program groups, and the generation unit (400 generates the communication setting of the information processing device such that one or a plurality of application data allocated to the control program group is stored in one application data set and transmitted for each of the one or the plurality of control program groups grouped by the grouping unit according to the allocation result of the grouping unit.

<Configuration 7>

A support device (300, 600, 600e) that supports a setting of a communication environment between a control device (100, 100e) that executes a control program (120) controlling a control target (500) while managing a plurality of pieces of process data (52) referred to or updated in the control program and an information processing device (200, 200b, 200e) that executes one or a plurality of applications (220) using one or a plurality of pieces of process data designated in the plurality of pieces of process data, the control device being configured to transmit one or a plurality of types of data sets (50) storing at least a part of the plurality of pieces of process data according to a predetermined communication setting (400), the information processing device being configured to execute the one or the plurality of applications using the one or the plurality of types of data sets transmitted from the control device, the support device including: a grouping unit (20, 20b, 20c, 20e) configured to allocate each of the one or the plurality of pieces of process data designated to be used in the one or the plurality of applications to one or a plurality of groups; and a generation unit (40, 40b, 40c, 40e) configured to generate the communication setting for the control device such that the one or the plurality of pieces of process data assigned to the group are stored in one data set and transmitted for each of the one or the plurality of groups grouped by the grouping unit according to an allocation result of the grouping unit.

<Configuration 8>

A support program (378, 678, 778) that supports a setting of a communication environment between a control device that executes a control program controlling a control target while managing a plurality of pieces of process data referred to or updated in the control program and an information processing device that executes one or a plurality of applications using one or a plurality of pieces of process data designated in the plurality of pieces of process data, the control device being configured to transmit one or a plurality of types of data sets (50) storing at least a part of the plurality of pieces of process data according to a predetermined communication setting (400), the information processing device being configured to execute the one or the plurality of applications using the one or the plurality of types of data sets transmitted from the control device, the support program causing a computer (300, 600, 600e, 700) to execute allocating (step 2) each of the one or the plurality of pieces of process data designated to be used in the one or the plurality of applications to one or a plurality of groups, and generating (step 3) the communication setting for the control device such that the one or the plurality of pieces of process data assigned to the group are stored in one data set and transmitted for each of the one or the plurality of groups grouped in the grouping according to an allocation result in the grouping.

It should be considered that the disclosed embodiment is an example in all respects and not restrictive. The scope of the present invention is defined by not the above description, but the claims, and it is intended that all modifications within the meaning and scope of the claims are included in the present invention. In addition, the inventions described in the embodiments and the modifications are intended to be implemented alone or in combination as much as possible.

REFERENCE SIGNS LIST 1, 1a, 1c, 1d, 1e, 1f: control system, 2, 2a, 2e: information system network, 4: control system network, 10a: FA system, 20, 20a, 20b, 20c, 20d, 20e, 20f: grouping means, 22: first grouping means, 24: second grouping means, 26: third grouping means, 40, 40a, 40b, 40c, 40d, 40e, 40f: generation means, 42: data set setting generation means, 44: generation condition generation means, 50: data set, 52: process data, 54: object, 56: CorrectionID, 58: storage region, 60, 60b: OPC UA client, 62: subscription management means, 64, 64b: subscription, 66, 66b, 84: communication driver, 70: transmission and reception management means, 72: process data management means, 74: topic list, 76: process data list, 80: OPC-UA server, 82: data set generation means, 100, 100a, 100d, 100e, 100f: controller, 110, 210, 310, 610, 710: processor, 120: control program, 146, 193, 294, 394, 694: USB controller, 150, 250, 350, 650, 750: volatile memory, 170, 270, 370, 670, 770: non-volatile memory, 180, 260: OPC UA program, 191: control system network IF, 192: information system network IF, 194: memory card IF, 194A: memory card, 195: internal bus controller, 196: chip set, 200, 200a, 200b, 200e, 200f: HMI, 220: application, 222: mapping information, 240: touch panel, 242, 340, 640: display, 244, 320, 620: input unit, 292, 792: communication IF, 296, 396, 696: processor bus, 300: support device, 360: development means, 372: support program, 374: development program for control program, 376: development program for application, 378, 678, 778: communication setting program, 392: optical drive, 392A: recording medium, 400, 800: communication setting, 420: data set setting, 440: generation condition, 460: storage information, 480: connection information, 500: field device, 580: storage unit, 582: sequence number, 600, 600e: setting device, 700: relay device, 772: PubSub program, 2050: application data set, 2052: application data.

The invention claimed is:

1. A control system comprising:

a control device configured to receive a plurality of pieces of process data from a plurality of field devices including a control target through a control system network and execute a control program that controls the control target while managing the plurality of pieces of process data related to control of the control target and referred to or updated in the control program, the control device being configured to transmit one or more data sets storing at least a part of the plurality of pieces of process data according to a communication setting;

an information processing device configured to execute a plurality of applications using one or more pieces of process data stored in the one or more data sets that are received from the control device;

grouping processing circuitry configured to allocate each of the one or more pieces of process data to one or more groups for each of the plurality of applications, according to at least one of an update period at which the process data is updated or a use period at which the process data is used by an application; and generation processing circuitry configured to generate the communication setting for the control device, the communication setting including a data set setting that defines a combination of process data included in the one or more groups to be included in one data set of the one or more data sets and a transmission condition for each of the one or more data sets, wherein the control device stores the one or more pieces of process data allocated to the one or more groups into the one or more data sets based on the data set setting, and transmits the one or more data sets to the information processing device when the transmission condition for the data set is satisfied.

2. The control system according to claim 1, wherein the communication setting includes information specifying a storage order of the one or more pieces of process data in each of the one or more data sets.

3. The control system according to claim 1, further comprising a support device configured to provide a development environment of the plurality of applications, wherein the support device includes the grouping processing circuitry and the generation processing circuitry.

4. The control system according to claim 1, further comprising a relay device configured to relay communication between the control device and the information processing device, wherein the relay device includes the grouping processing circuitry and the generation processing circuitry.

5. The control system according to claim 1, wherein the information processing device manages a plurality of application data referred to or updated in the plurality of applications; and transmits one or more application data sets that store at least a part of the plurality of application data according to a communication setting of the information processing device, the control device executes the control program using one or more application data designated in the plurality of application data using an application data set, the grouping processing circuitry allocates each of the one or more application data designated to be used in the control program to one or more control program groups, and the generation processing circuitry generates the communication setting of the information processing device such that one or more application data allocated to the control program group is stored in one application data set and transmitted for each of the one or more control program groups grouped by the grouping processing circuitry according to the allocation result of the grouping processing circuitry.

6. The control system according to claim 1, wherein the grouping processing circuitry comprises a first memory storing one or more programs and one or more first processors, wherein at least one of the one or more first processors is configured to access the first memory and execute one of the one or more programs to cause the at least one of the one or more processors to allocate each of the one or more pieces of process data to the one or more groups, and wherein the generating processing circuitry comprises a second memory storing one or more programs and one or more second processors, wherein at least one of the one or more second processors is configured to access the second memory and execute one of the one or more programs to cause the at least one of the one or more second processors to generate the communication setting for the control device.

7. The control system according to claim 1, wherein the communication setting includes a generation condition for the one or more data sets that indicates a timing at which the data set is generated.

8. The control system according to claim 1, wherein the grouping processing circuitry is configured to allocate each of the one or more pieces of process data to the one or more groups for each of the plurality of applications, further according to a data size of the process data.

9. A support device that supports a setting of a communication environment between a control device that receives a plurality of pieces of process data from a plurality of field devices including a control target through a control system network and executes a control program that controls the control target while managing the plurality of pieces of process data related to control of the control target and referred to or updated in the control program and an information processing device that executes a plurality of applications using one or more pieces of process data stored in one or more data sets that are received from the control device,
the control device being configured to transmit the one or more data sets to the information processing device according to a communication setting,
the information processing device being configured to execute the plurality of applications using the one or more data sets from the control device,
the support device comprising:
grouping processing circuitry configured to allocate each of the one or more pieces of process data to one or more groups for each of the plurality of applications, according to at least one of an update period at which the process data is updated or a use period at which the process data is used by an application; and
generation processing circuitry configured to generate the communication setting for the control device, the communication setting including a data set setting that defines a combination of process data included in the one or more groups to be included in one data set of the one or more data sets and a transmission condition for each of the one or more data sets,
wherein the control device stores the one or more pieces of process data allocated to the one or more groups into the one or more data sets based on the data set setting, and transmits the one or more data sets to the information processing device when the transmission condition for the data set is satisfied.

10. The support device according to claim 9, wherein the grouping processing circuitry is configured to allocate each of the one or more pieces of process data to the one or more groups for each of the plurality of applications, further according to a data size of the process data.

11. A non-transitory computer-readable storage medium storing a support program that supports a setting of a communication environment between a control device that receives a plurality of pieces of process data from a plurality of field devices including a control target through a control system network and executes a control program that controls the control target while managing the plurality of pieces of process data related to control of the control target and referred to or updated in the control program and an information processing device that executes a plurality of applications using one or more pieces of process data stored in one or more data sets that are received from the control device,
the control device being configured to transmit the one or more types of data sets to the information processing device according to a communication setting,
the information processing device being configured to execute the plurality of applications using the one or more data sets received from the control device,
the support program when executed by a computer, causing the computer to at least:
allocate each of the one or more pieces of process data to one or more groups for each of the plurality of applications, according to at least one of an update period at which the process data is updated or a use period at which the process data is used by an application; and
generate the communication setting for the control device, the communication setting including a data set setting that defines a combination of process data included in the one or more groups to be included in one data set of the one or more data sets and a transmission condition for each of the one or more data sets,
wherein the control device stores the one or more pieces of process data allocated to the one or more groups into the one or more data sets based on the data set setting, and transmits the one or more data sets to the information processing device when the transmission condition for the data set is satisfied.

12. The non-transitory computer-readable storage medium according to claim 11, wherein the support program when executed by the computer, causing the computer to allocate each of the one or more pieces of process data to the one or more groups for each of the plurality of applications, further according to a data size of the process data.

* * * * *